United States Patent
Beaumont et al.

[19]

[11] Patent Number: 5,812,647
[45] Date of Patent: Sep. 22, 1998

[54] DISPLAY BASED MARKETING MESSAGE CONTROL SYSTEM AND METHOD

[75] Inventors: Robert M. Beaumont; Danny J. Doiron, both of Saint John; Christopher G. Keevill; Trenton A. Pomeroy, both of Quispamsis; Gerald L. Pond, East Riverside, all of Canada

[73] Assignee: New North Media Inc., Canada

[21] Appl. No.: 76,648

[22] Filed: Jun. 14, 1993

[51] Int. Cl.⁶ ............................................ H04M 11/10
[52] U.S. Cl. .......................................... 379/111; 379/67
[58] Field of Search ........................... 379/90–93, 96–98, 379/88, 67, 111, 112, 113, 142; 348/12–14

[56] References Cited

U.S. PATENT DOCUMENTS

| | | | |
|---|---|---|---|
| 4,071,698 | 1/1978 | Borger, Jr. et al. | 179/2 R |
| 4,776,002 | 10/1988 | Kammerl | 379/88 |
| 4,790,003 | 12/1988 | Kepley et al. | 379/88 |
| 4,797,914 | 1/1989 | Vaello | 379/96 |
| 4,860,123 | 8/1989 | McCalley et al. | 358/342 |
| 4,864,601 | 9/1989 | Berry | 379/96 |
| 4,899,358 | 2/1990 | Blakley | 379/67 |
| 4,935,954 | 6/1990 | Thompson et al. | 379/89 |
| 4,943,995 | 7/1990 | Dandelin et al. | 379/67 |
| 4,972,462 | 11/1990 | Shibata | 379/89 |
| 4,988,209 | 1/1991 | Davidson et al. | 370/58.2 |
| 4,996,704 | 2/1991 | Brunson | 379/67 |
| 5,001,710 | 3/1991 | Gawrys et al. | 370/110.1 |
| 5,033,077 | 7/1991 | Bergeron et al. | 379/67 |
| 5,047,614 | 9/1991 | Bianco | 235/385 |
| 5,133,079 | 7/1992 | Ballantyne et al. | 445/4.1 |
| 5,191,410 | 3/1993 | McCalley et al. | 358/86 |
| 5,195,129 | 3/1993 | Yazawa et al. | 379/96 |
| 5,195,130 | 3/1993 | Weiss et al. | 379/98 |
| 5,231,566 | 7/1993 | Blutinger et al. | 364/401 |
| 5,236,199 | 8/1993 | Thompson, Jr. | 273/439 |
| 5,404,393 | 4/1995 | Remillard | 379/96 |
| 5,515,424 | 5/1996 | Kenney | 379/96 |

FOREIGN PATENT DOCUMENTS

| | | | |
|---|---|---|---|
| 1157551 | 11/1983 | Canada | 344/13 |
| 1213026 | 10/1986 | Canada | 344/18 |
| 1243790 | 10/1988 | Canada | 379/2 |
| 1261493 | 9/1989 | Canada | 379/3 |
| 1270584 | 6/1990 | Canada | 379/3 |

*Primary Examiner*—Stephen Chin
*Assistant Examiner*—Kevin Kim
*Attorney, Agent, or Firm*—Hayes, Soloway, Hennessey, Grossman & Hage, P.C.

[57] ABSTRACT

A marketing system for use in a public switched telephone system having stored program controlled switches connected to customer premise equipment having an Analog Display Service Interface, comprises a storage device for storing predetermined information respecting each of customer premise equipment, a device for assembling and managing messages including creating a message to be delivered to one or more of the customer premise equipment, linking each message with one or more of the customer premise equipment, scheduling the delivery of the messages at a predetermined time, and measuring the response of each customer premise equipment to messages delivered thereto.

7 Claims, 58 Drawing Sheets

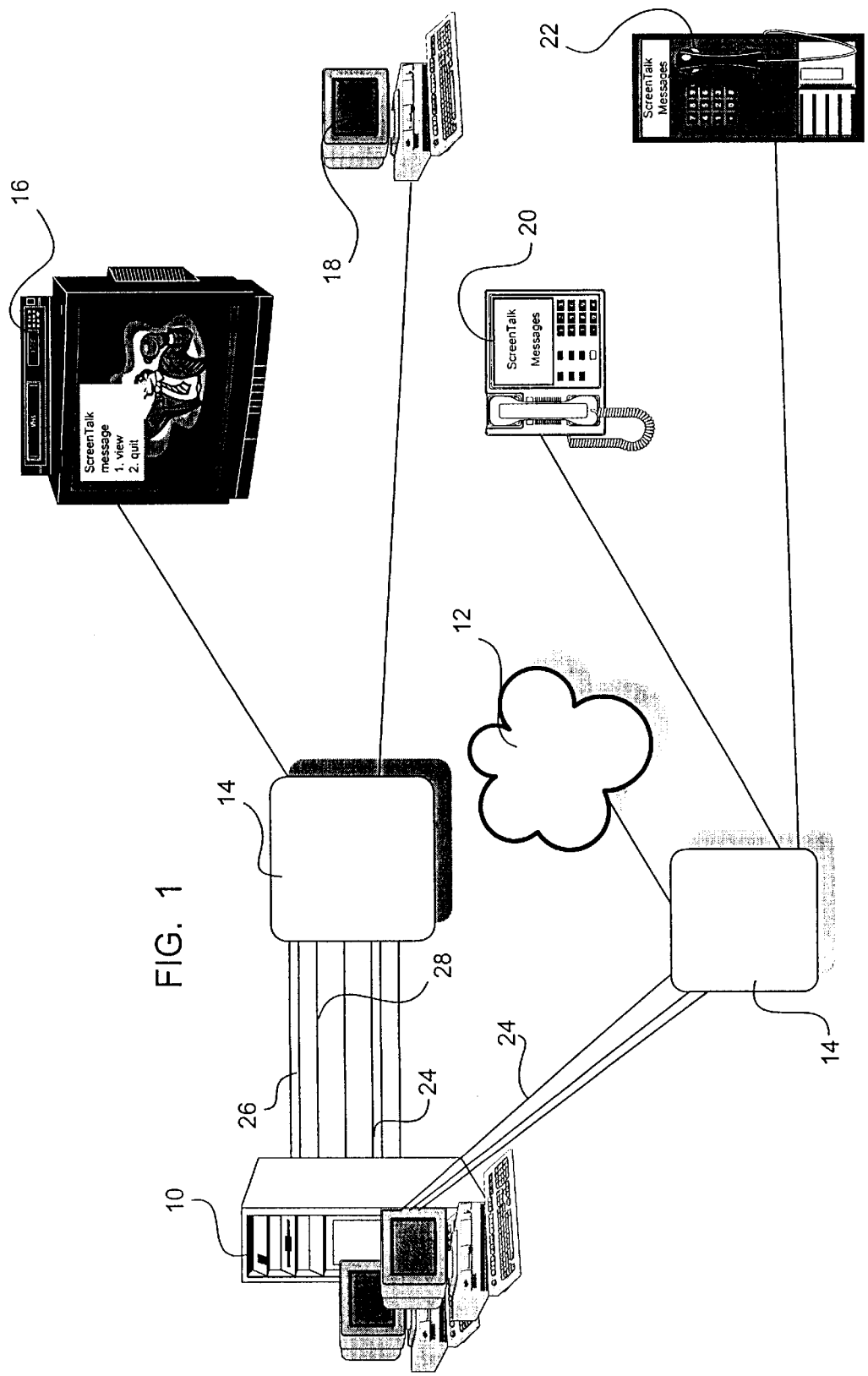

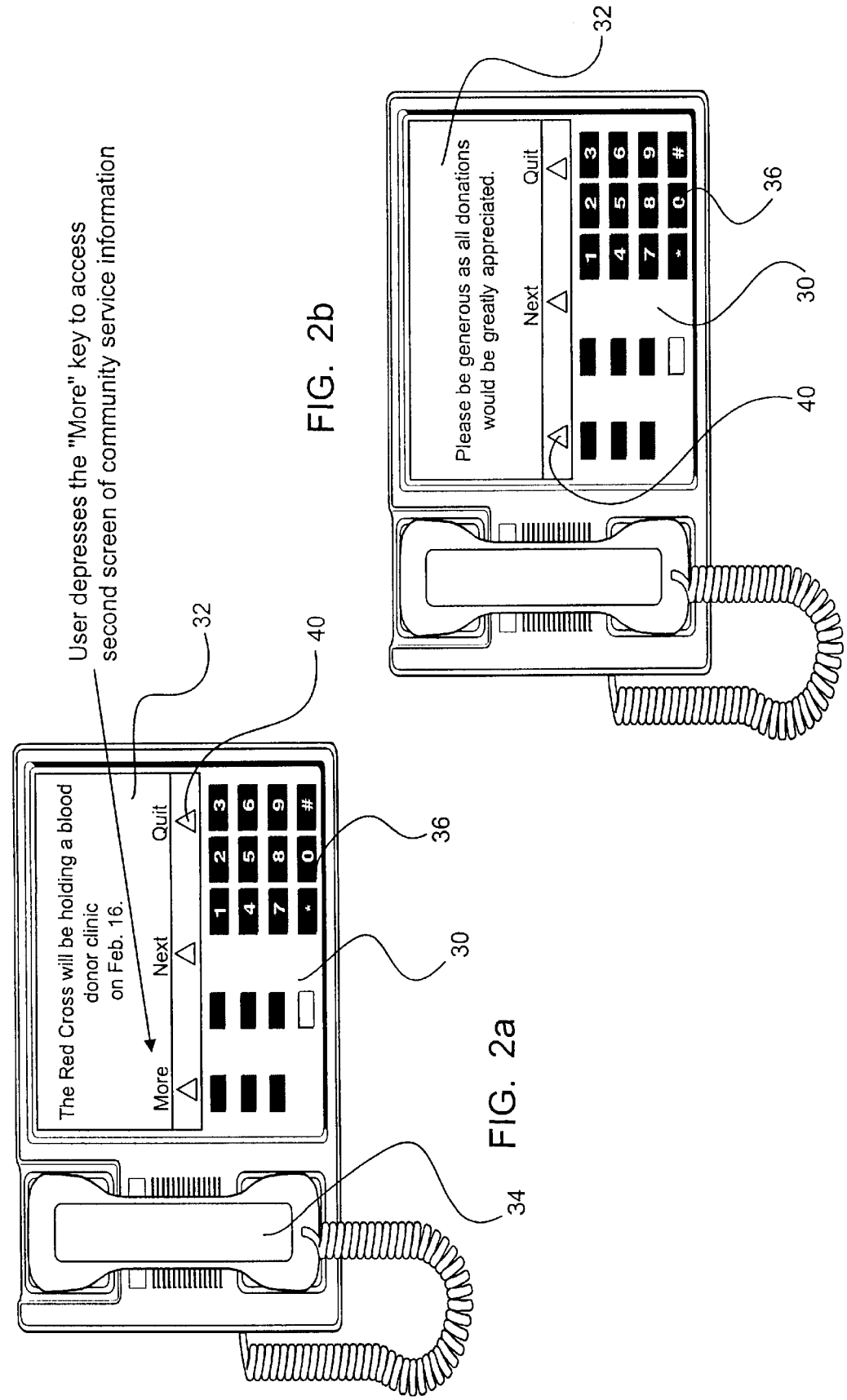

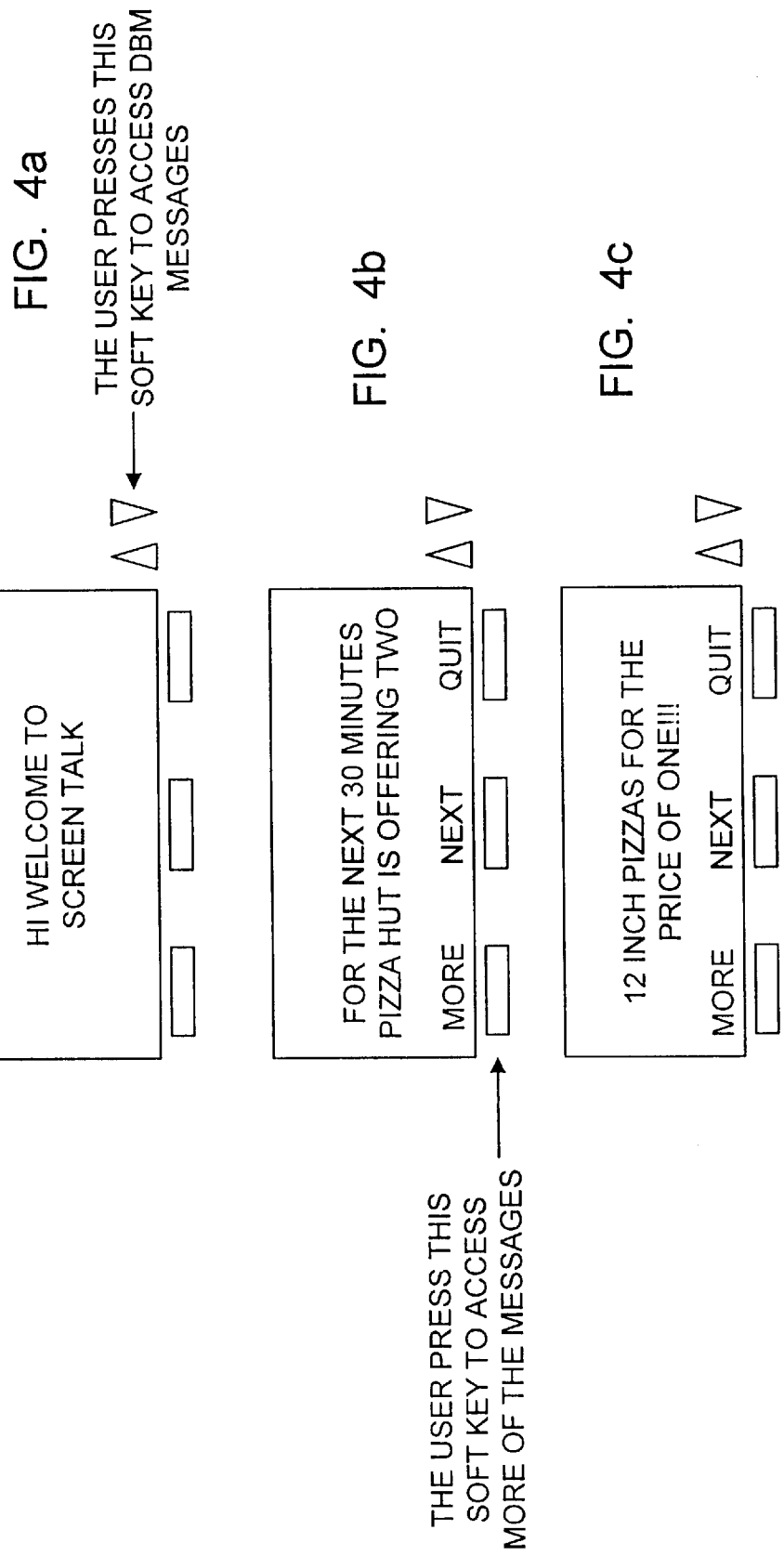

This menu item steps the user through D.B.M. message creation, in a (hopefully) logical sequece. The first table requiring entry is the message head table.
Do you wish to continue?(y/n): Y Query Add Del Update Next Back Jump Screen Table Parent Child More
Query the database using this form D.B.M. Message Creation Form
---

Retailer:   [    ] Ad Number:  [    ] Ad Type:  [    ]
Target:     [    ] Verified? []

Next, the text for the ad should be set up.
Do you wish to continue? Y

Query Add Del Update Next Back Jump Screen Table Parent Child More
Query the database using this form D.B.M. Message -- Text Entry Form
---

AD_NUMBER: [    ] RETAILER:
Line Number: [    ]
                        ADSI Phone Display Upper: I [       ]  I
Lower: I [       ]  I
Labels: I [    ] [    ] [    ] [    ] [    ]
---
Action: I [       ][       ][       ][       ][       ]

Last, the ad should be scheduled for download and prioritized using the prioritized Priority table.
Do you wish to continue? Y

FIG. 6B

Query Add Del Update Next Back Jump Screen Table Parent Child More
Query the database using this form
                        priority
                D.B.M. Priority Form
---

AD NUMBER: [    ] RETAILER:    HITRATE: [    ]%
Download Hour: [    ]
Priority: [    ]

Process completed. To update the download schedule use menu item 5.
Hit <CR> to continue...

FIG. 6C

```
Query Add Del Update  Next Back Jump Screen Table Parent Child More
Query the database using this form D.B.M. Message Creation Form
             ----------------------------------------------------

Retailer: [     ] Ad Number: [     ] Ad Type: [     ]
Target:   [     ] Verified? []
```

FIG. 6D

```
Query Add Del Update Next Back Jump Screen Table Parent Child More
Query the database using this form D.B.M. Message -- Text Entry Form
             ----------------------------------------------------
AD_NUMBER:  [     ] RETAILER:
Line Number: [  ]

ADSI Phone Display
             ----------------------------------------------------
Upper:| [         ]  |
Lower:| [         ]  |
Lables:| [    ] [   ] [   ] [   ] [   ]
       ----------------------------
Action:| [      ][      ][      ][      ][      ]
```

6E continued

```
Scheduling and Priority Menu
------------------------------------
1) Add, query or modify the priority and scheduling table.
2) Schedule a list of ads in multiple hours.
3) Examine the download schedule.
q) Exit from Scheduling menu.
```

```
What hours do you wish this list to apply to?
Enter a list of hours, (using 24 hour clock),
separated by spaces: 15 16 17 18
```

| hour | precedence | ad_num | target |
|------|------------|--------|--------|
| 15 | 19 | 732 | magic3 |
| 15 | 40 | 655 | vcr |
| 15 | 58 | 110 | ownhome |
| 15 | 98 | 998 | res |
| 16 | 11 | 670 | fastfood |
| 16 | 28 | 751 | movies |
| 16 | 30 | 265 | sports |
| 16 | 31 | 835 | dinein |
| 16 | 35 | 345 | res |
| 16 | 76 | 876 | res |
| 16 | 84 | 152 | res |
| 16 | 98 | 998 | res |
| 17 | 12 | 126 | female |
| 17 | 15 | 695 | ski2 |
| 17 | 24 | 201 | res |
| 17 | 29 | 425 | res |
| 17 | 32 | 740 | family |
| 17 | 40 | 655 | vcr |
| 17 | 61 | 770 | res |
| 17 | 98 | 998 | res |
| 18 | 9 | 976 | loto |
| 18 | 31 | 835 | dinein |
| 18 | 36 | 355 | res |
| 18 | 41 | 315 | female |
| 18 | 63 | 651 | res |
| 18 | 65 | 115 | res |
| 18 | 75 | 156 | res |
| 18 | 76 | 876 | res |
| 18 | 94 | 1008 | res |
| 18 | 98 | 998 | res |

(EOF):

FIG. 6F

Prior to execution of the refresh, the messages
for this hour should have been created and
verified. Has this been done? (y/n): Y Please enter the hour you wish to refresh: 15

FIG. 6I

```
Query Add Del Update Next Back Jump Screen Table Parent Child More
Query the database using this form D.B.M. Generic Screen Presentation Form
          ---------------------------------------------------------------
Banner Message:   [ Hi! Welcome to ]
                  [  screen talk   ]
Interim Message: [ Please wait - I'm ]
                  [ collecting messages ]
"Next" Softkey
Label for last Ad: [    ]
Do you wish to register your changes ? Warning....
This impacts screens for all residents.
Enter (y/n):
```

FIG. 6K

```
    User Initiated Refresh Utilities
   --------------------------------
1) Refresh Message Head Table Creation Form.
2) Refresh Message Text Form.
3) Enable Refresh Messages for Download.
4) Examine the Refresh Log.
q) Exit this Menu.
```

FIG. 6L

```
DBM Reports Menu
----------------
1) Display the Refresh log.
2) Display the Response log.
3) Clear the Refresh log.
4) Clear the Response log.
5) Display the Refresh log (Page mode).
6) Display the Response log (Page mode).
q) Exit this menu.
```

```
Tue 93/03/16 10:21:25 Calling DN 8471751 Called DN 6529490
Tue 93/03/16 11:05:59 Calling DN 6320921 Called DN 6529490
Tue 93/03/16 11:13:25 Calling DN 6320921 Called DN 6529490
Tue 93/03/16 11:18:47 Calling DN 6320921 Called DN 6367702
Tue 93/03/16 11:22:09 Calling DN 6580292 Called DN 6529490
Tue 93/03/16 11:24:12 Calling DN 8470393 Called DN 6529490
Tue 93/03/16 11:25:47 Calling DN 8470393 Called DN 6529490
Tue 93/03/16 12:34:07 Calling DN 6320921 Called DN 6529490
Tue 93/03/16 12:34:42 Calling DN 6320921 Called DN 6367702
Tue 93/03/16 13:32:26 Calling DN 8470705 Called DN 6529490
Tue 93/03/16 13:33:22 Calling DN 8470705 Called DN 6367707
Tue 93/03/16 13:34:07 Calling DN 8470705 Called DN 6529490
Tue 93/03/16 13:34:53 Calling DN 8470705 Called DN 6367702
Tue 93/03/16 13:35:35 Calling DN 8470705 Called DN 6367702
Tue 93/03/16 14:16:45 Calling DN 8474136 Called DN 6367707
Tue 93/03/16 14:17:51 Calling DN 8474136 Called DN 6367702
Tue 93/03/16 14:56:19 Calling DN 8470596 Called DN 6529490
Tue 93/03/16 14:56:41 Calling DN 8470596 Called DN 6529490
Tue 93/03/16 14:57:34 Calling DN 8470596 Called DN 6529490
Tue 93/03/16 14:58:45 Calling DN 8470596 Called DN 6367707
Tue 93/03/16 15:04:38 Calling DN 8470596 Called DN 6529490
Tue 93/03/16 15:05:19 Calling DN 8470596 Called DN 6529490
Tue 93/03/16 15:06:21 Calling DN 8470596 Called DN 6529490
```

6-L
continued

```
Scheduling and Priority Menu
------------------------------------
1) Add, query or modify the priority and scheduling table.
2) Schedule a list of ads in multiple hours.
3) Examine the download schedule.
q) Exit from Scheduling menu.
```

```
Wed 93/03/17 22:12:26 Calling DN 8470518 Called DN 6367716
Thu 93/03/18 00:55:03 Calling DN 8471017 Called DN 6367006
Thu 93/03/18 00:57:35 Calling DN 8471017 Called DN 6367006
Thu 93/03/18 07:57:47 Calling DN 8473807 Called DN 6367799
Thu 93/03/18 07:59:08 Calling DN 8473807 Called DN 6367799
Thu 93/03/18 08:07:37 Calling DN 8470393 Called DN 6367706
Thu 93/03/18 08:11:47 Calling DN 6320921 Called DN 6367706
Thu 93/03/18 08:36:56 Calling DN 8474196 Called DN 6367799
Thu 93/03/18 09:05:19 Calling DN 8472111 Called DN 6367019
Thu 93/03/18 09:16:25 Calling DN 8473165 Called DN 6367706
Thu 93/03/18 09:23:43 Calling DN 8472183 Called DN 6367027
Thu 93/03/18 09:24:43 Calling DN 8470239 Called DN 6367706
Thu 93/03/18 09:30:47 Calling DN 8477303 Called DN 6367706
Thu 93/03/18 09:33:32 Calling DN 8477303 Called DN 6367006
Thu 93/03/18 10:00:04 Calling DN 8474275 Called DN 6367716
Thu 93/03/18 10:21:57 Calling DN 8473441 Called DN 6367042
Thu 93/03/18 10:35:40 Calling DN Called DN 6331145
Thu 93/03/18 10:35:49 Calling DN Called DN 6331145
Thu 93/03/18 10:36:09 Calling DN Called DN 6331145
Thu 93/03/18 10:36:33 Calling DN Called DN 6331145
Thu 93/03/18 10:37:45 Calling DN Called DN 6331145
Thu 93/03/18 10:43:17 Calling DN Called DN 6331145
Thu 93/03/18 10:43:47 Calling DN Called DN 6331145
Thu 93/03/18 10:45:09 Calling DN Called DN 6331145
Thu 93/03/18 10:48:21 Calling DN Called DN 6331145
Hit CR to continue:
```

FIG. 6M

Please enter the ad number you want to copy:

Please enter the new ad number:

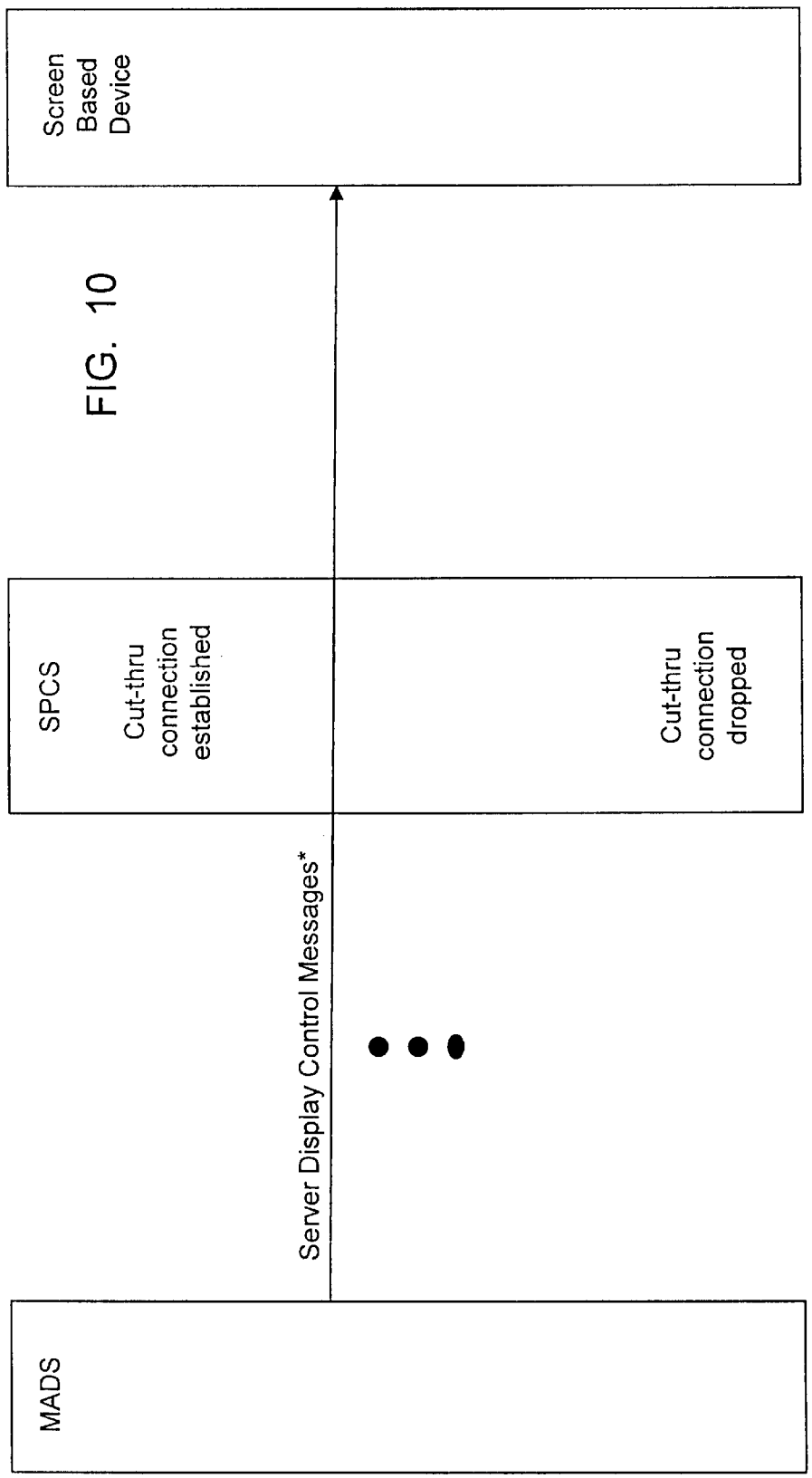

SURVEY00

SCREEN TALK SURVEY DATA
- MAIN MENU -

1. LOAD SURVEY DATA
2. SELECT SURVEY DATA
3. DELETE SURVEY DATA
4. PRINT SURVEY DATA
5. LOAD UNIX DATA
6. SELECT UNIX DATA
7. PRINT UNIX DATA
8. BACK UP DATA
9. EXIT

SELECT NUMBER:

93/03/20                    SCREEN TALK SURVEY DATA                                   SURVEY10
15:59         - INPUT DATA FOR PARTICIPANT DATA BASE -
                    GENERAL PARTICIPANT CATEGORIES
TELEPHONE:           PARTICIPANT NAME:
CARD NO: 0           GENDER (M/F):       PARTICIPANT AGE: 0              FAMILY SIZE: 0
                              HOUSEHOLD AGE CATEGORIES
UNDER 6 MALE: 0    UNDER 6 FEMALE: 0      0 6 TO 12 MALE: 0      6 TO 12 FEMALE: 0
13 TO 19 MALE: 0   13 TO 19 FEMALE: 0     0 20 TO 29 MALE: 0     20 TO 29 FEMALE:
30 TO 39 MALE: 0   30 TO 39 FEMALE: 0     0 40 TO 49 MALE: 0     40 TO 49 FEMALE:
50 TO 59 MALE: 0   50 TO 59 FEMALE: 0     0 60TO69 MALE: 0       60 TO 69 FEMALE:
                   OVER 70 MALE: 0        OVER 70 FEMALE: 0
                         MARITAL STATUS CATEGORIES
           MARRIED:      SINGLE:      SEPARAT/DIVORC:          WIDOWED:
                       EMPLOYMENT STATUS CATEGORIES
FULLTIME:    PARTTIME:     LOOKING:    NOT/LOOKING:             RETIRED:
                         LEVEL OF EDUCATION CATEGORIES
ELEMENT:  SOME HIGH:  HIGH SCHL:  COMM.COLG:  SOME UNIV:         UNIVRSTY:
                       HOUSEHOLD INCOME CATEGORIES
< THAN 15K:   15K-34,999:      35K-49,999:         OVER 50K:        REFUSED:
    MULTIPLE WAGE EARNER:                     T-D BANKER:

SELECT CRITERIA:              |ENTER       | F2
                                        |NEXT MENU   | ABORT

FIG. 11B

93/03/20          SCREEN TALK SURVEY DATA                    SURVEY11
16:00    - INPUT DATA FOR HOUSEHOLD DATA BASE -

HOUSEHOLD MAKE-UP CATEGORIES

OWN DWELLING:         RENT DWELLING:
                   TYPE OF DWELLING
SINGLE DETACH:    SINGLE ATTACHED:    APARTMENT:          MOBILE HOME:
                   TYPE OF HEATING
ELEC HEAT:        OIL HEAT:      WOOD HEAT:               OTHER HEAT:
                  HOUSEHOLD PET CATEGORIES
DOGS:    CATS:    BIRDS:    OTHER PET:    NO PETS:
                   AUTOMOBILE CATEGORIES
OF AUTOS: 0    AUTO YEAR: 0    AUTO MAKE:      AUTO MODEL:
                 AUTO YEAR: 0    AUTO MAKE:      AUTO MODEL:
                 AUTO YEAR: 0    AUTO MAKE:      AUTO MODEL:
                 DEALER SERVICE: HOME EMPLOYMENT:
              HOME/OFFICE EQUIPMENT CATEGORIES
FAX MACH:    ANSW.MACH:    VOICE MES:    PHOTO COP:    COMPUTER:    TYPWRITER:

SELECT CRITERIA:      | ENTER      | F2
                               | NEXT MENU  | ABORT

FIG. 11 C

93/03/20　　　SCREEN TALK SURVEY DATA　　　　　　　　　　　SURVEY12
16:00　　　　- INPUT DATA FOR LEISURE DATA BASE -

SPORT PARTICIPANT CATEGORIES
　　　　　　　　　　　ACTIVE IN SPORTS　:
BICYCLING:　　　BOATING:　　　HIKE:　　　　BOWL:
GOLF:　　　　　　TENNIS:　　　　SOCCER:　　　HOCKEY:
DOWN HILL:　　　CROSS CTRY:　　FISHING:　　　AEROBICS:
CAMPING:　　　　AQUATIC ACT:　　OTH ACTVTY:

LEISURE ACTIVITY CATEGORIES
CRAFTS:　　READING:　　MUSIC:　　PHOTO:　　OTHER LEIS:

WEEKLY SPENDING CATEGORIES
MOVIES: 0.00　　FAST FOOD: 0.00　DINE-IN: 0.00　　BINGO: 0.00
HORSES: 0.00　　THEATER:　 0.00　SPEC SPORT: 0.00　　OTHER SPEND: 0.00

CLUB OR ASSOCIATION CATEGORIES
　　　　　　　　　　　CLUB OR ASSOC:

TRAVEL OUTSIDE N.B. CATEGORIES
ONCE/WEEK:　　ONCE/MONTH:　　ONCE/YEAR:　　OTHER TRAVEL:

SPECIAL INTERESTS CATEGORIES
TV HOURS/DAY: 0　　RADIO STATION:　　RADIO INFO:

SELECT CRITERIA:　　|　　ENTER　　|　　F2
　　　　　　　　　　　　 NEXT MENU　　 ABORT

SCREEN TALK SURVEY DATA                              SURVEY13
- INPUT DATA FOR TECHNOLOGY DATA BASE -

HOME TECHNOLOGY CATEGORIES

VCR: MICROWAVE:   CD PLAYER:   VIDEO CAMER:   NINT/COMP:
                  NEW SERVICES CATEGORIES
USE A PAGtER:     CELLULAR PHONE:   BANKING MACHINE:  0
COMFTBLE ANSW:    FOLLOW PROMPTS:   CALL AGAIN:

SELECT CRITERIA:        | ENTER      | F2
                        | NEXT MENU  | ABORT

FIG. 11 E

```
93/03/20                    SCREEN TALK SURVEY DATA                          SURVEY14
16:00           - INPUT DATA FOR PATTERN DATA BASE -
                        LOTTERIES CATEGORIES
                              PLAY LOTTERY:
ONCE/DAY:   ONCE/WEEK:    ONCE/MONTH:    ONCE/YEAR:         OTHER LOTTERY:
                    SHOP FOR GROCERIES CATEGORIES
VILLAGE:   SOBEYS:   IGA:   SUPERSTORE:   SAVE EASY:
CO-OP OTHER GROCERY:          EXCLUSIVE:         SPECIALS:
                    BANKING PATTERN CATEGORIES
# OF BANKS: 0      VISA:      MASTER CD:     AMER EX:    SEARS:     CAN. TIRE:
GAS CARD:              OTHER CARDS:
                    PROMOTIONS CATEGORIES
COUPONS: 0    CONTESTS: O    CLUB CARD: 0    BILLBOARDS: 0    1-800: 0
DIRECT MAIL: 0   NO PAYMNT: 0   T.V. ADS: 0   RADIO ADS: 0    NEWSPAPER: 0
                    SCREENTALK CATEGORIES
MORNING:   AFTERNOON:    EVENING:   ALL DAY:
MR.:       MRS.:     DAUGHTER:    SON:       OTHER MEM:
                PRODUCTS AND SERVICES CATEGORIES
% GROCERIES:0  % CLOTHING: 0  % MED/DENT: 0  %APPLNCE: 0  % AUTOMOTIVE:0
% ENTERTAIN:0  % HARDWARE: 0  % OTHER:0        % OTHER PRODUCTS:

SELECT CRITERIA:       |   ENTER      |   F2
                                  |   NEXT MENU  |   ABORT
```

FIG. 11 F

```
93/03/20              SCREEN TALK SURVEY DATA                    SURVEY20
16:02        - SELECTION CRITERIA FOR PARTICIPANT DATA BASE -
             - YOU CAN MAKE FROM ONE TO NINE SELECTIONS -
                     *GENERAL PARTICIPANT CATEGORIES*
CARD #: 0    GENDER (M/F):       AGE: 0         FAMILY SIZE: 0
                       HOUSEHOLD AGE CATEGORIES
UNDER 6 MALE:0   UNDER 6 FEMALE:0    6 TO 12 MALE:0   6 TO 12 FEMALE:0
13 TO 19 MALE:0  13 TO 19 FEMALE:0   20 TO 29 MALE:0  20 TO 29 FEMALE:0
30 TO 39 MALE:0  30 TO 39 FEMALE:0   40 TO 49 MALE:0  40 TO 49 FEMALE:0
50 TO 59 MALE:0  50 TO 59 FEMALE:0   60 TO 69 MALE:0  60TO69 FEMALE:0
                 OVER 70 MALE:0      OVER 70 FEMALE:0
                     MARITAL STATUS CATEGORIES
MARRIED:    SINGLE:     SEPARAT/DIVORC:      WIDOWED:
                     EMPLOYMENT STATUS CATEGORIES
FULLTIME:   PARTTIME:  LOOKING:  NOT/LOOKING:  RETIRED:
                     LEVEL OF EDUCATION CATEGORIES
ELEMENT:  SOME HIGH:    HIGH SCHL.:    COMM.COLG:   SOME UNIV:   UNIVRSTY:
                     HOUSEHOLD INCOME CATEGORIES
< THAN 15K:   15K-34,999:   35K49,999:   OVER 50K:   REFUSED:
                 MULTIPLE WAGE EARNER:   T-D BANKER:

SELECT CRITERIA:     | ENTER      | F2      | F4
                     | NEXT MENU  | ABORT   | COMPLT
```

FIG. 11 G

```
93/03/20            SCREEN TALK SURVEY DATA              SURVEY21
  16:02   - SELECTION CRITERIA FOR HOUSEHOLD DATA BASE -
          - YOU CAN MAKE FROM ONE TO NINE SELECTIONS -
               HOUSEHOLD MAKE-UP CATEGORIES
     OWN DWELLING:              RENT DWELLING:
               TYPE OF DWELLING
SINGLE DETACH:  SINGLE ATTACHED:    APARTMENT:    MOBILE HOME:
               TYPE OF HEATING
ELEC HEAT:      OIL HEAT:    WOOD HEAT:           OTHER HEAT:
               HOUSEHOLD PET CATEGORIES
DOGS:    CATS:    BIRDS:    OTHER PET:       NO PETS:
               AUTOMOBILE CATEGORIES
   SELECTIONS: YEAR/MAKE/MODEL COUNT AS 3 SELECTIONS EACH
#OF AUTOS:0   AUTO YEAR:0   AUTO MAKE:   AUTO MODEL:    DEALER SERVICE:
HOME EMPLOYMENT:
          HOME/OFFICE EQUIPMENT CATEGORIES
FAX MACH:    ANSW.MACH:         VOICE MES:       PHOTO COP:      COMPUTER:
   TYPWRITER:

SELECT CRITERIA:    | ENTER      |   F2    |  F4
                           | NEXT MENU  |  ABORT  | COMPLT
```

SCREEN TALK SURVEY DATA                                              SURVEY22
- SELECTION CRITERIA FOR LEISURE DATA BASE -
- YOU CAN MAKE FROM ONE TO NINE SELECTIONS -
SPORT PARTICIPANT CATEGORIES
ACTIVE IN SPORTS:

BICYCLING:       BOATING:       HIKE:          BOWL:
GOLF:            TENNIS:        SOCCER:        HOCKEY:
DOWN HILL:       CROSS CTRY:    FISHING:       AEROBICS:
CAMPING:         AQUATIC ACT:   OTHER ACT:
LEISURE ACTIVITY CATEGORIES
CRAFTS:          READING:       MUSIC:         PHOTO:         OTHER LEIS:
WEEKLY SPENDING CATEGORIES
MOVIES:0.00      FAST FOOD:0.00  DINE-IN:0.00   BINGO:0.00
HORSES:0.00      THEATER:0.00    SPEC SPORT:0.00   OTHER SPEND:0.00
CLUB OR ASSOCIATION CATEGORIES
CLUB OR ASSOC:
TRAVEL OUTSIDE N. B. CATEGORIES
ONCE/WEEK:       ONCE/MONTH:    ONCE/YEAR:     OTHER TRAVEL:
SPECIAL INTERESTS CATEGORIES
TV HOURS/DAY:0   RADIO STATION:   RADIO INFO:

SELECT CRITERIA:     |  ENTER       |   F2    |  F4
                     |  NEXT MENU   |  ABORT  |  COMPLT

FIG. 11 I

93/03/20          SCREEN TALK SURVEY DATA          SURVEY23
   16:02   - SELECTION CRITERIA FOR TECHNOLOGY DATA BASE -
          - YOU CAN MAKE FROM ONE TO NINE SELECTIONS -
             HOME TECHNOLOGY CATEGORIES
VCR:     MICROWAVE:    CD PLAYER:     VIDEO CAMER:    NINT/COMP:
             NEW SERVICES CATEGORIES
USE A PAGER:     CELLUAR PHONE:          BANKING MACHINE:0
COMFTBLE ANSW:   FOLLOW PROMPTS:    CALL AGAIN:

SELECT CRITERIA:    | ENTER        | F2      | F4
                    | NEXT MENU    | ABORT   | COMPLT

FIG. 11 J

```
93/03/20                SCREEN TALK SURVEY DATA              SURVEY24
  15:53       - SELECTION CRITERIA FOR PATTERN DATA BASE -
              - YOU CAN MAKE FROM ONE TO NINE SELECTIONS -
                              PLAY LOTTERY:
ONCE/DAY:          ONCE/WEEK:    ONCE/MONTH:   ONCE/YEAR:       OTHER LOTTERY:
                SHOP FOR GROCERIES CATEGORIES
VILLAGE:     SOBEYS:       IGA:        SUPERSTORE:        SAVE EASY:
CO-OP:       OTHER GROCERY:      EXCLUSIVE:      SPECIALS:
                BANKING PATTERN CATEGORIES
#OF BANKS: 0       VISA:     MASTER CD:     AMER EX:     SEARS:     CAN.TIRE:
GAS CARD:    OTHER CARDS:
                PROMOTIONS CATEGORIES
COUPONS: 0     CONTESTS: 0    CLUB CARD: 0     BILLBOARDS: 0      1-800:      0
DIRECT MAIL: 0  NO PAYMNT: 0   T.V. ADS: 0     RADIO ADS: 0       NEWSPAPER: 0
                SCREENTALK CATEGORIES
MORNING:          AFTERNOON:         EVENING:         ALL DAY:
MR.:              MRS.:              DAUGHTER:        SON:         OTHER MEM:
              PRODUCTS AND SERVICES CATEGORIES
% GROCERIES: 0       % CLOTHING: 0       % MED/DENT: 0      %APPLNCE:0
%AUTOMOTIVE: 0       % ENTERTAIN:0       % HARDWARE:0       %OTHER:0
OTHER PRODUCTS:

SELECT CRITERIA:  |  ENTER      |   F2     |   F4
                            |  NEXT MENU  |   ABORT  |   COMPLT
```

SCREEN TALK SURVEY DATA
- TELEPHONE NUMBERS SELECTED -
TELEPHONECARD NO

SURVEY25

| TELEPHONE | CARD NO |
|---|---|
| 0 | 0 |
| 8470003 | 33 |
| 8470004 | 151 |
| 8470014 | 26 |
| 8470016 | 173 |
| 8470056 | 191 |
| 8470068 | 167 |
| 8470099 | 28 |
| 8470137 | 82 |
| 8470140 | 29 |
| 8470199 | 76 |
| 8470239 | 7 |
| 8470306 | 118 |
| 8470425 | 54 |
| 8470561 | 43 |

MORE

SELECT CRITERIA: | F2 RETRYW | F3 RITE | F4 PRINT | F7 BACK | F8 FORWARD | F9 MENU

FIG. 11 L

```
93/03/23              SCREEN TALK SURVEY DATA                    SURVEY25
09:07              - TELEPHONE NUMBERS SELECTED -
===============================================================================
TELEPHONE CARD NO
===============================================================================
8470004151
8470013782
8470384171
8470386925
8472207379
8472756152
8473210120
8473807113
8490683143
8492626685

PRINT HAS REACHED THE END OF THE DATA BASE ..
# OF TELEPHONE NUMBERS PRINTED =                     10

PAGE NO: 1
```

FIG. 11 M

SURVEY27

SCREEN TALK SURVEY DATA
- WRITE SEARCH FILE TO DISK -

INSERT A FORMATTED DISKETTE IN DRIVE A

ENTER YOUR FILE NAME BELOW: XXXXXXXX.YYY

PRESS ENTER TO WRITE FILE, F2 TO ABORT

SURVEY30

SCREEN TALK SURVEY DATA
- DELETE RECORD FROM BASES -

ENTER PHONE NUMBER YOU WISH TO DELETE o

PRESS ENTER TO DELETE, F2 TO ABORT

SURVEY40

SCREEN TALK SURVEY DATA
- PRINT RECORDS FROM BASES-

ENTER PHONE NUMBER YOU WISH TO PRINT

0

PRESS ENTER TO PRINT, F2 TO ABORT

SURVEY50

SCREEN TALK SURVEY DATA
- WRITE UNIX DATA TO BASES -

INSERT UNIX DISKETTE IN DRIVE A

ENTER INPUT FILE NAME BELOW: XXXXXXX.YYY

PRESS ENTER TO ADD DATE, F2 TO ABORT

SCREEN TALK UNIX DATA
- SELECT UNIX DATA FROM BASES -

SURVEY60

| DAY OF WEEK | START WMMDD | END WMMDD | START HOUR | END HOUR | CALLED NUMBER | CALLING NUMBER |
|---|---|---|---|---|---|---|
| O | O | O | O | O | O | O |

PRESS ENTER TO SEARCH, F2 TO ABORT

SCREEN TALK UNIX DATA
- SELECT SORT OPTIONS FOR BASES -

SURVEY61

FOR CALLED NUMBER SORT PRESS D

FOR CALLING NUMBER SORT PRESS G

ENTER PREFERRED SORT TYPE:

FIG. 11 S

93/03/23       SCREEN TALK UNIX DATA                SURVEY62
09:51      - UNIX DATA SORTED BY CALLED NUMBER -

| CALLED # | CALLING # | |
|---|---|---|
| 4546767 | 6367777 | TOTAL NUMBER RECORDED = 1 |
| 6330415 | 6367792 | TOTAL NUMBER RECORDED = 1 |
| 6364765 | 6367795 | TOTAL NUMBER RECORDED = 1 |
| 6580292 | 6529490 | |
| 6580292 | 6367019 | |
| 6580292 | 6529490 | |
| 6580292 | 6367026 | |
| 6580292 | 6367029 | |
| 6580292 | 6367004 | |
| 6580292 | 6367029 | |
| 6580292 | 6367027 | |
| 6580292 | 6529490 | |

MORE

SELECT CRITERIA: | F2 RETRY | F3 WRITE | F4 PRINT | F7 BACK | F8 FORWARD | F9 MENU |

FIG. 11 T

SURVEY64

SCREEN TALK UNIX DATA
- WRITE UNIX FILE TO DISK-

INSERT A FORMATTED DISKETTE IN DRIVE A

ENTER YOUR FILE NAME BELOW: XXXXXXX.YYY

PRESS ENTER TO WRITE FILE, F2 TO ABORT

SCREEN TALK SURVEY DATA
- TELEPHONE NUMBERS SELECTED -
===========================================================

| TELEPHONE | CARD NO |
|---|---|
| 8496906 | 6367020 |
| 8496906 | 6529490 |
| 8496906 | 6367706 |
| 8496906 | 6529490 |
| 8496906 | 6367749 |
| 8496906 | 6529490 |
| 8496906 | 6529490 |
| 6496906 | 6529490 |
| 8496906 | 6367019 |
| 8496906 | 6367784 |
| 8496906 | 6529490 |
| 8496906 | 6529490 |
| 8496906 | 6529490 |
| 8496906 | 6529490 |
| 8496906 | 6529490 |
| 8496906 | 6529490 |
| | TOTAL NUMBER RECORDED = 26 |
| 8497122 | 6367716 |
| 8997122 | 6367799 |
| 8497122 | 6529490 |
| | TOTAL NUMBER RECORDED = 3 |
| 8498177 | 6367749 |
| 8498177 | 6529490 |
| | TOTAL NUMBER RECORDED = 2 |
| 8498393 | 6367014 |
| | TOTAL NUMBER RECORDED = 1 |
| 8498682 | 6367706 |
| 8498682 | 6529490 |
| | TOTAL NUMBER RECORDED = 2 |
| 8499312 | 6367022 |
| 8499312 | 6367023 |
| 8499312 | 6367023 |
| 8499312 | 6367020 |
| 8499312 | 6367021 |
| 8499312 | 6367019 |
| 8499312 | 6367716 |

FIG. 11V

PRINT HAS REACHED THE END OF THE DATA BASE...

OF TELEPHONE NUMBERS PRINTED = 406

PAGE NO: 12

SURVEY80

SCREEN TALK SURVEY DATA
- DATA BASE MAINTENANCE -

1. BACKUP DATA BASE
2. RESTORE DATA BASE

9. RETURN TO PREVIOUS MENU

SELECT NUMBER:

SURVEY81

SCREEN TALK SURVEY DATA
- BACKUP DATA BASE -

1. PARTICIPANT
2. HOUSE HOLD
3. TECHNOLOGY
4. LEISURE
5. UNIX N

9. RETURN TO PREVIOUS MENU

SELECT NUMBER:

SCREEN TALK SURVEY DATA
- TECHNOLOGY BASE RESTORE -

SURVEY83

INSERT BACKUP DISKETTE IN DRIVE A

PRESS ENTER TO RESTORE BASE, F2 TO ABORT

FIG. 11 Y

DISPLAY BASED MARKETING MESSAGE CONTROL SYSTEM AND METHOD

The present invention relates to a method and an apparatus for creating a marketing communications channel whereby display based informational, promotional and advertisement messages are delivered through a public telephone network to unattended screen based devices in a non-intrusive manner.

BACKGROUND OF THE INVENTION

As screen based telephony becomes more prevalent, there is a need to employ these screens to provide a marketing communications channel that has attributes that exceed those of traditional mass marketing communications channels—television, radio, direct mail and telephone soliciting. Existing channels are not intrinsically targetable and measurable, i.e. they do not intrinsically have the ability to target a single screen based device or any group of screen based devices with messages that are based on consumer demographics or buying behaviour.

SUMMARY OF THE INVENTION

The present invention provides a marketing communications channel that is intrinsically targetable and measurable. The ability to target a single screen based device or any group of screen based devices with messages that are based on consumer demographics or buying behaviour means that messages have more relevance to consumers and advertisers. Targeting can be controlled by: direct marketers—thereby increasing the effectiveness of the message; and by the consumer—thereby increasing the acceptance of the message. Since this medium is connected to the public telephone network, it provides for a high degree of measurability. Messages prompt users to generate calls directly to the marketer or to interactive information systems. These calls can be counted by traditional telephony means providing response measurement statistics for the direct marketer.

One aspect of the present invention is defined as a marketing system for use in a public switched telephone system having stored program controlled switches connected to customer premise equipment having an Analog Display Service Interface, the system comprising a storage device for storing predetermined information respecting each of customer premise equipment, a device for assembling and managing messages including creating a message to be delivered to one or more of the customer premise equipment, linking each message with one or more of the customer premise equipment, scheduling the delivery of the messages at a predetermined time, and measuring the response of each customer premise equipment to messages delivered thereto.

Another aspect of the present invention is defined as a process for non-intrusively delivering informational, promotional and advertisement messages over a public telephone network to unattended screen based devices, comprising the steps of creating a message to be delivered, storing said message, selecting one or more of said screen based devices to which said message is to be delivered, scheduling said message for delivery at a predetermined time, delivering said message at said predetermined time, detecting a response to said message; and storing said response.

In the preferred embodiment a response to a message is made at the option of a customer who nay select one of several soft keys to cause auto-dialling of a retailer's premises or an interactive system which provides more information. The auto-dialling allows the number of responses for each message to be In the preferred embodiment a response to a message is made at the option of a customer who may select one of several soft keys to cause auto-dialling of a retailer's premises or an interactive system which provides more information. The auto-dialling allows the number of responses for each message to be obtained as well as a ratio of this number to the screen based devices which actually received the message.

BRIEF DESCRIPTION OF THE DRAWINGS

These and other features of the invention will become more apparent from the following description in which reference is made to the appended drawings wherein:

FIG. 1 is a diagrammatic view illustrating the preferred embodiment of the message control system of the present invention connected to display based devices via stored program controlled switches of a digital Public Switched Telephone Network;

FIGS. 2a–2c are diagrammatic representations of display based telephone units and FIGS. 2d–2e are diagrammatic representations of television units serving as screen based devices contemplated by the present invention;

FIGS. 4a–4c are diagrammatic representations of how DBM messages are reviewed on the idle display of a Seasame® telephone;

FIGS. 6A through 6M illustrate various computer screens of the preferred embodiment of the control system of the present invention;

FIG. 10 is a view similar to FIG. 9 but for message delivery to Sesame® telephone after stored program controlled switch cut through connections have been established;

FIGS. 11A through 11Y illustrate various computer screens showing the results of a variety of control system processes;

DESCRIPTION OF PREFERRED EMBODIMENT

General Description

Figure 2C:
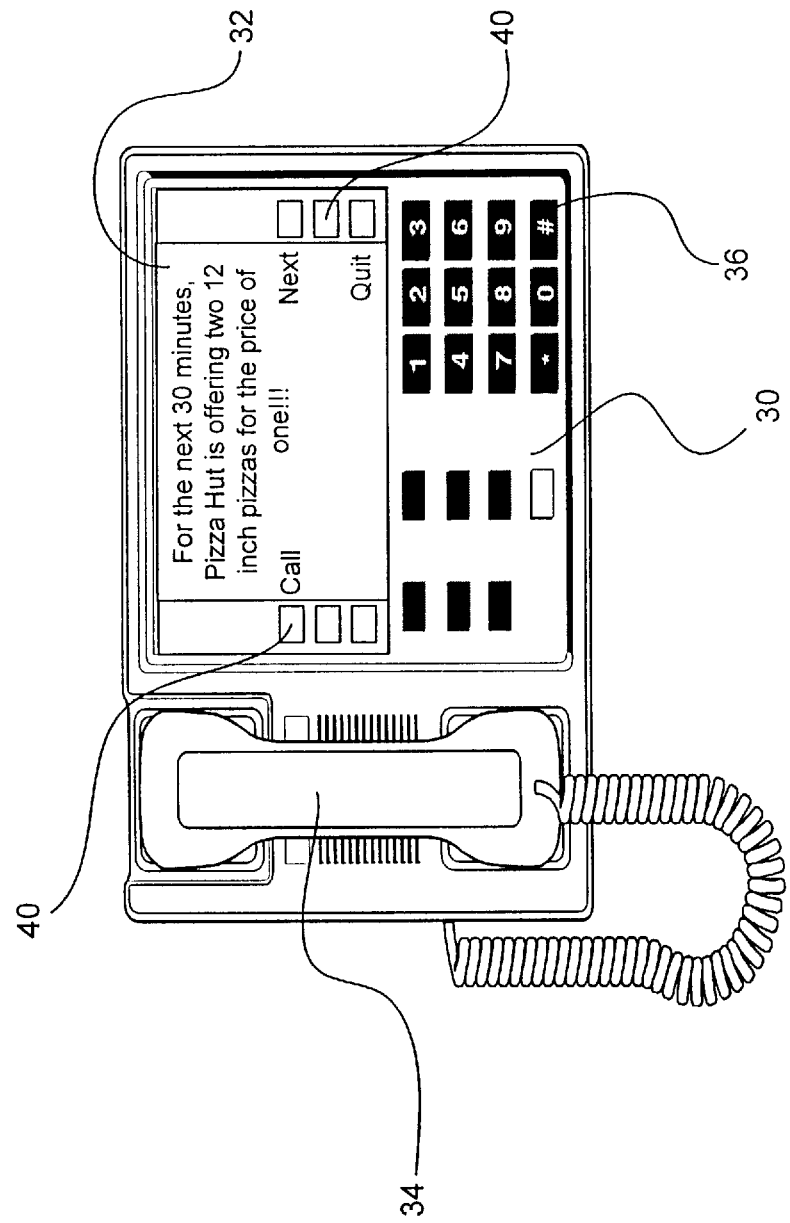
Figure 3A:
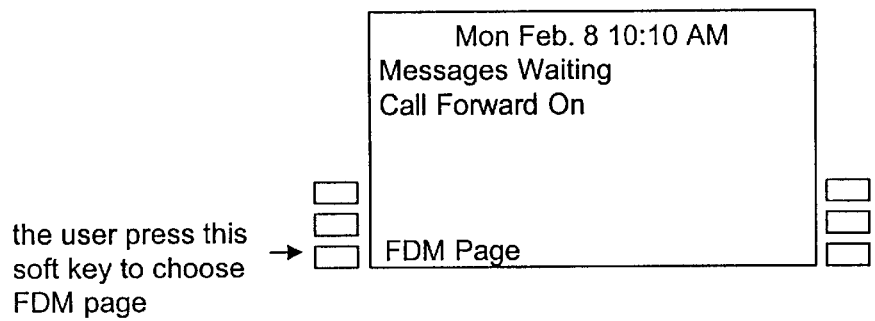
FIGS. 3a–3d are diagrammatic representations of how DBM messages are reviewed in the Feature Download Management Facility of a SR-INS-002461[1] compliant device.
Figure 3B:
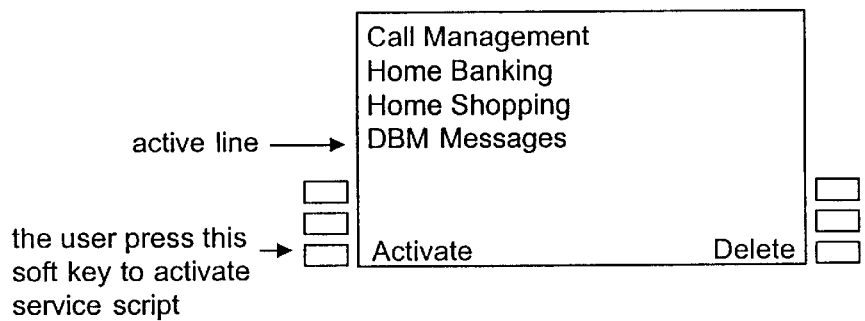
Figure 3C:
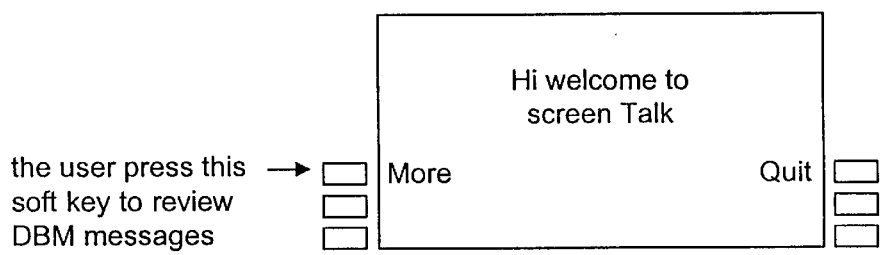
Figure 3D:
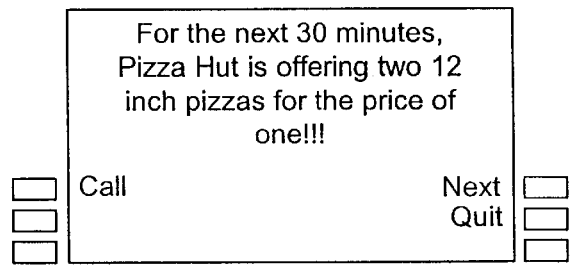

Three fundamental components are required to establish the new marketing communications channel according to the present invention. As shown in FIG. 1, these include a Display Based Marketing (DBM) control system 10, a digital Public Switched Telephone Network (PSTN) 12 having Stored Program Controlled Switches (SPCS) 14, and screen based devices 16, 18, 20 and 22 connected to the public telephone network and which have the ability to receive and store display based messages when unattended. The control system provides the ability to create messages, target messages to individual screen based devices, deliver messages to those devices, offer additional information on messages, and gather response rates to messages by those devices. Message delivery is non-intrusive, that is message delivery is initiated by the system through the SPCS to unattended screen based devices without ringing the screen based device. To perform this, message delivery circuits 24 must be provided by the SPCS that provide the means to make a connection through the SPCS to the screen based device without ringing the screen based device. The type of message delivery circuits required for each SPCS depends upon the functionality of the SPCS. The marketing communications channel achieved by the present invention provides targetability to the resolution of a single screen based device. Thus, a unique connection must be established, through the SPCS, between the control system and each screen based device targeted for delivery of messages according to the present invention. The number of message delivery circuits required for each SPCS can be determined by simple traffic engineering.

Screen based devices 16–22 initially manifest as devices compliant with SR-INS-002461[1], devices with adjuncts that are compliant with SR-INS-002461[1], and devices that are prototypes of SR-INS-002461[1] like the Northern Telecom Sesame® telephone. The control system initiates non-intrusive delivery of messages to unattended screen based devices to be viewed at the leisure of the device user. The screen based device must, therefore, in the unattended state, accept control system initiated message delivery and allow the storage of messages until the control system overwrites the messages with new messages or the user of the device erases the messages. Devices compliant with SR-INS-002461[1], have the ability to permanently store messages. Devices that are prototypes of SR-INS-002461[1] can only temporarily store messages and can be erased before the user has viewed them. To overcome this problem, the control system provides a refresh facility so that users of prototype devices like the Northern Telecom Sesame® telephone may request another delivery of lost messages.

Individual message content may include, but is not limited to, community service information, straight advertising, electronic coupons redeemable for discounts, and sponsored information. Message delivery to screen based devices is scheduled—hourly, daily, weekly, etc. During a scheduled delivery, numerous individual messages from numerous message sponsors are grouped together and delivered by the control system to screen based devices. The number of individual messages included in the delivery is a function of the storage capability of the targeted screen based device and, thus, as initially defined by SR-INS-002461[1]. The manner in which messages appear on the screen of a screen based device is a function of the screen size of the device.

The messages delivered to the screen based devices program soft-keys on the screen based device as defined by SR-INS-002461[1]. Messages will typically program soft keys as:

More—when pressed causes the screen based device display more of an individual message.

Next—when pressed causes the screen based device to skip to the next message of a multi-message delivery.

Call—when pressed causes the screen based device to auto dial the telephone number programmed by the display based message. The destination of the call is the retailer/direct marketer.

Listen—when pressed causes the screen based device to auto dial the telephone number programmed by the display based message. The destination of call is an interactive information system.

Start—appears with the last message and when pressed causes the screen based device to display the first message.

Quit—when pressed returns the display of the screen based device to its default state.

Individual messages will prompt users to depress a soft key programmed with Call or Listen to allow the user to obtain additional information about a particular message, a product or a service. The Call soft key causes the screen based device to generate a call to a retailer or direct marketer. The Listen soft key causes the screen based device to generate a call to information sources such as a voice mail box, an interactive voice response (IVR) system, or an interactive system that follows SR-NWT-002495[2]. Regardless of the destination, these calls are crucial to the communications channel because they can be counted by traditional telephony means, providing response measurement statistics which are of great value to the direct marketer.

One component of the system provides the mechanism for providing additional information. These components are: voice mail system or interactive voice response system, an interactive system that follows the recommendations of SR-NWT-002495[2]. As these systems receive telephone calls, lines or trunks 26 are required from the SPCS serving the system.

The system collects the call count/response measurement information by employing an SPCS feature and data link 28 compliant with TR-TSY-000032[3]. This SPCS feature is assigned to all telephone lines and numbers that receive calls generated by depressing a soft key on a screen based device in response to a message. This feature and the required data link may be required from multiple SPCS.

Detailed Description

In the current form, the marketing communications channel includes screen based devices compliant, and screen based devices with adjuncts that are compliant, with SR-INS-002461[1]. It will also include the Northern Telecom Sesame® telephone that is a near compliant prototype of SR-INS-002461[1]. In the near term, screen based devices will proliferate the public telephone network with numerous competing standards arising. The technology based components of the present invention will evolve to support these new standards, though the principles and fundamental concepts of the marketing communications channel will remain the same—a marketing communications channel whereby display based informational, promotional and advertisement messages are delivered through the public telephone network to unattended screen based devices in a non-intrusive manner.

The following detailed description describes specifically a method and an apparatus for the delivery of display based informational, promotional and advertisement messages through the public telephone network to unattended screen based devices compliant with SR-INS-002461[1], unattended screen based devices with adjuncts that are compliant with SR-INS-002461[1], and unattended Northern Telecom Sesame® telephones.

Screen Based Devices

Before describing the method and apparatus of the present invention, it would be useful to review screen based devices. Messages are stored in screen based devices compliant with SR-INS-002461[1] and adjuncts compliant with SR-INS-002461[1] as service scripts employing the Feature Download Management (FDM) facility of these devices. The actual commands (Feature Download Message Parameters) for downloading service scripts to the screen based device are described in TR-NWT-001273[4]. The messages are delivered to unattended screen based devices employing the Server-initiated service script update methodology defined in SR-INS-002461[1] section 3.1.3.1.2. DBM messages® or screenTalk® or some other name that uniquely identifies these messages will appear on the FDM Page.

FIGS. 2a, 2b and 2c illustrate display based devices in the form of telephone units 30 having display screens 32. The messages delivered to the units in FIGS. 2a and 2b are in the form of community service messages while that of FIG. 2c is a straight advertising message. Each of these units includes conventional handsets 34 and keypads 36. In addition, each includes a number (three in FIGS. 2a and 2b and six in FIG. 2c) of soft-keys 40, i.e. programmable keys, in the form of spring loaded depressible buttons. The appropriate label for each key is imbedded in the message delivered to the unit as explained more fully later. The display based devices illustrated in FIGS. 2d and 2e are in the form of television sets. The messages in these cases are sponsored messages. These units are not provided with physical buttons. Rather, selections are made by manipulating a remote screen control unit (not shown) which controls a cursor on the television screen. The manner in which selections are made does not form part of the present invention and, accordingly, is not described in detail. FIGS. 3a through 3d illustrate the procedure for reviewing DBM messages, where messages are stored in the FDM Facility of a SR-INS-002461[1] compliant device.

The Northern Telecom Sesame® telephone is a prototype of SR-INS-002461[1]. This screen based device does not support the FDM facility and thus cannot store messages as service scripts. Since these devices do not support the FDM facility, they cannot be forced off-hook as defined in SR-INS-002461[1] section 3.1.3.1.2. Because of this, the messages are delivered to on-hook Sesame® telephones. The Sesame® telephone closely follows the Data Transmission Protocol and Data Link Layer requirements for on-hook data transmission without power ringing as defined in TR-NWT-000030[5]. As such, the Sesame® does not provide Data Link Layer acknowledgments. However, the Sesame® closely adheres to the Server Display Control facility of SR-INS-002461[1], and it is this facility that is employed by the present invention to store messages in these devices. The actual commands (Server Display Control Messages) closely follow those defined in TR-NWT-001273[4]. FIG. 4 illustrates the procedure for reviewing DBM messages, where messages are stored in a Sesame® telephone and available on the idle display. The Sesame® erases the contents of the Server Display Control facility when the telephone is taken off-hook. As a result, messages are lost if the Sesame® is taken off-hook, and it is possible that the user can erase the messages before they are viewed. To overcome this problem, the system provides a Refresh Mechanism, described later, through which users can request the immediate re-delivery of messages.

Message Control System

Figure 5:
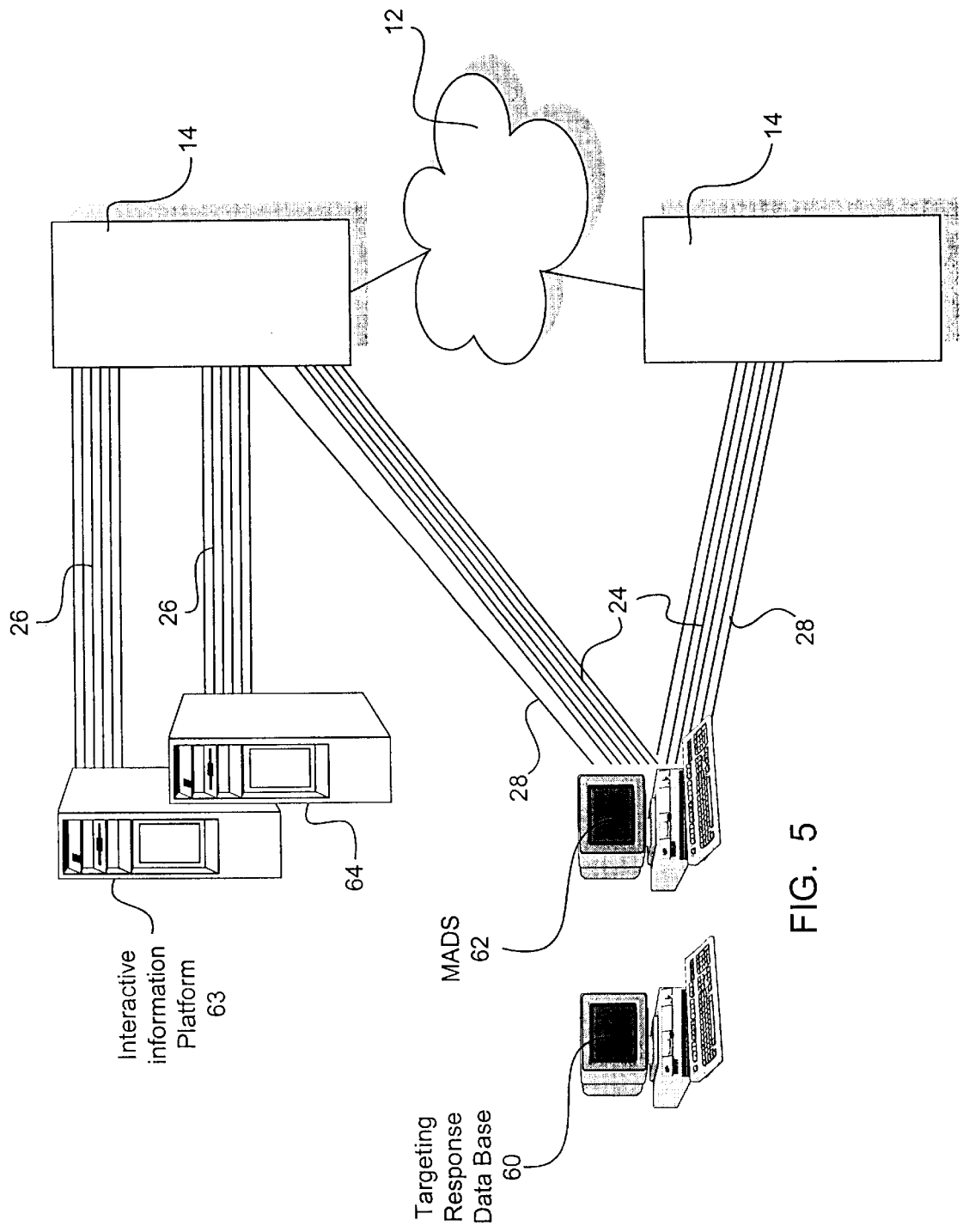
FIG. 5 is a view similar to FIG. 1 but illustrates other aspects of the preferred embodiment of the present invention.

FIG. 5 illustrates the three elements which comprise the Display Based Marketing (DBM) System. These elements are the Targeting and Response Database (TRDB) 60, the Message Assembly and Delivery System (MADS) 62, and the Interactive Information Platforms (IIP) 63 and 64.

Targeting and Response Database

In the preferred embodiment of the present invention, the Targeting and Response Database (TRDB) 60 is an executable software program which may be created using any commercially available database management program, such as Aston Tate's DB3+ software package which operates in the DOS (Disk Operating System) environment on a personal computer. The TRDB allows the DBM operator to create target groups of screen based devices and compile reports from the response measurements collected. All screen based devices connected to the public telephone network are identified by the telephone number assigned to it by the serving telephone company. The Targeting and Response Database relates the screen based device, its telephone number and a profile of the person(s) or family using the screen based device. The database user profile consists of demographic and purchasing habit information that can be used to target DBM messages. The screen based device user receiving DBM messages may have access to the profile to allow control over the message types and message contents the user will accept. Users may change their profile by calling the DBM System operator or by accessing an interactive response system that updates the user profile in the TRDB.

When DBM messages require targeting to specific user profiles, the defining attributes are selected from the available attributes in the TRDB (for example, age, salary, number of children, grocery store of choice, etc.) by the DBM system operator. The TRDB returns, in the form of an ASCII file, the telephone numbers of the screen based devices that are targeted. This file is then transferred to the Message Assembly and Delivery System (MADS). Response measurement information in the form of an ASCII file is transferred from the MADS to the TRDB. The TRDB processes this information into report format to be provided to the retailer or direct marketer.

The TRDB menus, as viewed from the operator's console, are illustrated in FIGS. 11A to 11Y. FIG. 11A illustrates the main menu which appears when the TRDB is loaded. Option 1, "Load Survey Data", allows the DBM operator to input individual consumer information. Option 2, "Select Survey Data", allows the DBM operator to select a target consumer or a target group of consumers, based on specific consumer information found in the database. The request provides telephone number(s) and club card number(s). A club card is a means by which consumers who receive DBM messages may differentiate themselves, when interfacing with retailers, from consumers who do not receive DBM messages. Club cards may be used to claim electronic coupons from retailers as an example of the cards multiplicity of uses. Option 3, "Delete Survey Data", simply allows the DBM operator to remove all information on an individual consumer from the TRDB by telephone number. Option 4, "Print Survey Data", enables the DBM operator to print all survey data for an individual consumer in the database by telephone number. Option 5, "Load Unix Data", allows DBM operator to import response logs from the MADS into the TRDB. Option 6, "Select Unix Data", allows the DBM operator to view response activity on an individual or all consumers in the database. Option 7, "Print Unix Data", allows the DBM operator to print response activity on an individual or all consumers in database. Option 8, "Back Up Data", facilitates back up and restoration of TRDB.

FIGS. 11B to 11L illustrate the various data input and selection screens and the type and nature of information stored by the TRDB in connection with each display based device in an area. FIGS. 11M and 11N illustrate the results of a targeting process, i.e. a list of telephone numbers. This list is stored in electronic form as an ASCII file, as previously mentioned, which will be accessed by the Message Assembly and Delivery System.

The screens illustrated in FIGS. 11B to 11F allow the operator to input and edit consumer information. The screen illustrated in FIG. 11B allows the DBM operator to input consumer database information, such as customer name, telephone number, club card membership number, gender, family size, the various age categories of family members, marital status, employment status, level of education, range of family income, number of household members contributing to family income and which bank is used for day to day banking requirements. The screen illustrated in FIG. 11C allows the DBM operator to input consumer database information such as dwelling owned or rented, the type of dwelling, source of heat, if customer has pets, listed by number and type, number of automobiles including the year, make, model, and if serviced by dealer. If customer has facsimile machine, voice messaging, photocopier, computer or typewriter. The screen illustrated in FIG. 11D allows the DBM operator to input consumer database information such as sports in which household members actively participate, their leisure activities, how much is spent weekly on movies, fast food, dining out, bingo, at the horse races, theatre, on spectator sports and other categories of this nature. Membership in clubs or associations. Frequency of travel outside of the province. Number of hours television viewed per day, radio station listened to and what radio information of greatest interest. The screen illustrated in FIG. 11E allows the DMB operator to input consumer database information such as customer ownership of video cassette recorder, microwave, compact disk player, video camera and Nintendo® or comparable unit, frequency of usage of a pager, cellular phone and banking machine (ABM/ATM), comfortability factor in leaving a message on an answering machine and behaviour when reaching an integrated voice response system. The screen illustrated in FIG. 11F allows the DMB operator to input consumer database information such as frequency of playing lotteries, preferred grocery store, number of banks dealt with, number of credit cards including type, acceptance of various promotional mediums, preferred time to review screenTalk messages, which family members view messages and preferred shopping location for various products and services.

The screens illustrated in FIGS. 11G to 11K allow the operator to select consumer or target groups of consumers. The screen illustrated in FIG. 11G allows DBM operator to select a target consumer or target group of consumers, based on specific consumer information such as customer name, telephone number, club card membership number, gender, family size, the various age categories of family members, marital status, employment status, level of education, range of family income, number of household members contributing to family income and which bank is used for day to day banking requirements. The screen illustrated in FIG. 11H allows the DBM operator to select a target consumer or target group of consumers, based on specific consumer information such as dwelling owned or rented, the type of dwelling, source of heat, whether customer has pets, listed by number and type, number of automobiles including the year, make, model, and whether serviced by dealer, whether customer has a facsimile machine, voice messaging, photocopier, computer or typewriter. The screen illustrated in FIG. 11I allows the DBM operator to select a target consumer or target group of consumers based on specific consumer information such as sports in which household members actively participate, their leisure activities, how much is spent weekly on movies, fast food, dining out, bingo, at the horse races, theatre, on spectator sports and other categories of this nature. Membership in clubs or associations; frequency of travel outside of the province; number of hours television viewed per day, radio station listened to and what radio information of greatest interest. The screen illustrated in FIG. 11J allows the DMB operator to select a target consumer or target group of consumers based on specific consumer information such as customer ownership of video cassette recorder, microwave, compact disk player, video camera and nintendo or comparable unit. Frequency of usage of a pager, cellular phone and banking machine (ABM/ATM); Comfortability factor in leaving a message on an answering machine; behaviour when reaching an integrated voice response system. The screen illustrated in FIG. 11K allows the DBM operator to select a target consumer or target group of consumers, based on specific consumer information such as frequency of playing lotteries, preferred grocery store, number of banks dealt with, number of credit cards including type, acceptance of various promotional mediums, preferred time to review screenTalk messages, which family members view messages and preferred shopping location for various products and services.

FIGS. 11L and 11M are sample outputs of main menu item 2 "Select Survey Data". The outputs provide telephone number(s) and club card number(s). FIG. 11N is a sample of screen information displayed from a submenu option of main menu item 2 Select Survey Data. FIG. 11O is a sample screen of main menu item 3 "Delete Survey Data" which allows the DBM operator to remove all information on an individual consumer from the TRDB by telephone number. FIG. 11P is a sample screen of main menu item 4 "Print Survey Data" which allows the DBM operator to print all survey data for an individual consumer in the database by telephone number. FIG. 11Q is a sample screen of main menu item 5 "Load Unix Data" which allows the DBM operator to manually import response logs from the MADS into the TRDB. FIG. 11R is a sample screen of main menu item 6 "Load Unix Data" which allows DBM operator to view response activity on an individual or all consumers in database. FIG. 11S is a sample of screen information from a submenu option of main menu item 6 "Select Unix Data". FIG. 11T is a sample of screen information from a submenu option of main menu item 6 "Select Unix Data". FIG. 11U is a sample of screen information from a submenu option of main menu item 6 "Select Unix Data". FIG. 11V is a sample of screen information from a submenu option of main menu item 6 "Select Unix Data". FIG. 11W is a sample screen of main menu item 8 "Back Up Data". which allows back up and restore of TRDB.

Figure 12:
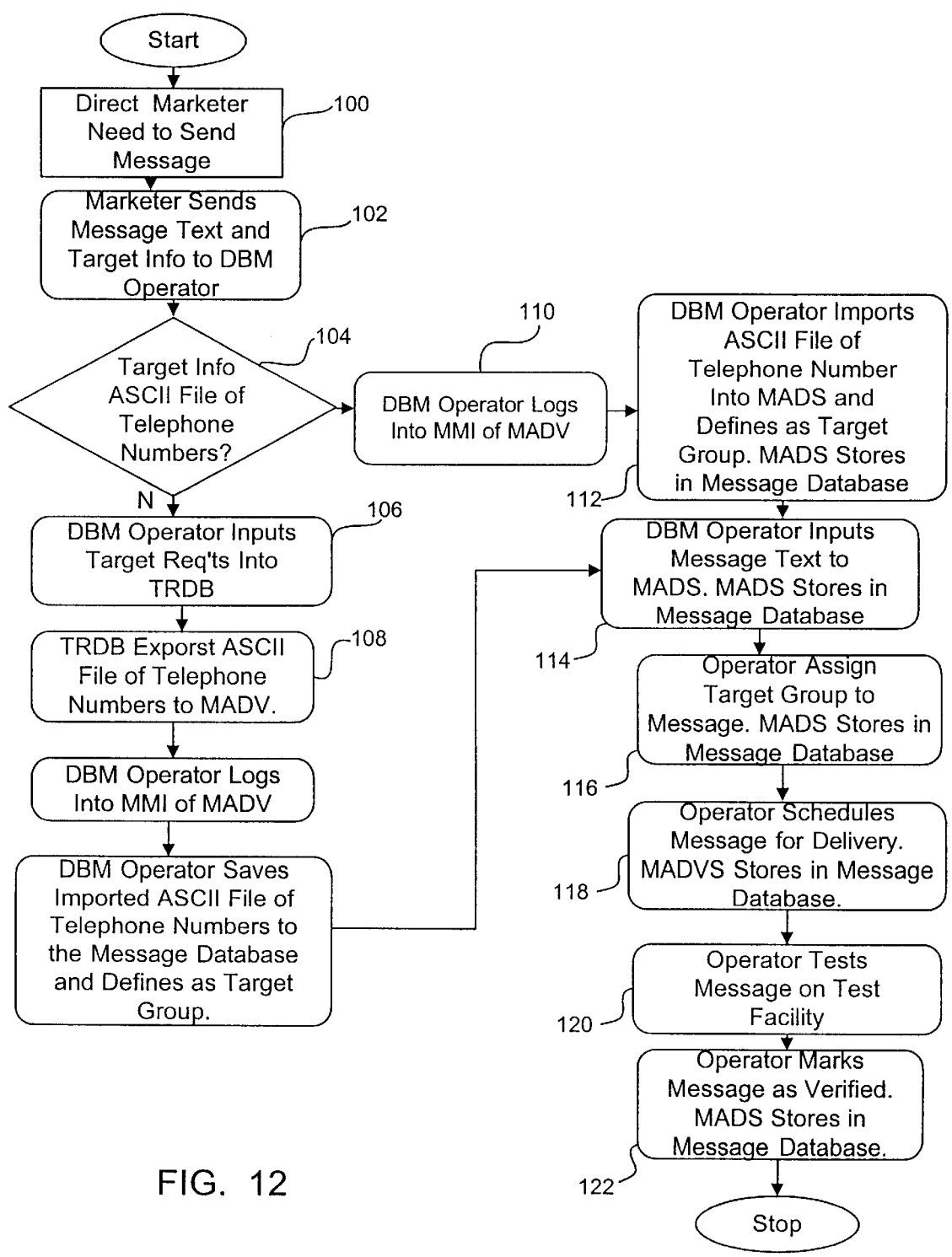
FIG. 12 is a flow chart illustrating the Message Input process according to a preferred embodiment of the present invention.

With reference to FIG. 12, when a marketer wishes to send a DBM message to a target group of subscribers (100), he or she sends the text of the message and target information to the DBM operator (102). The operator then determines at (104) whether there already exists an ASCII file containing the telephone numbers of devices which satisfy the target information. This would occur, for example, if the marketer had previously sent a message with identical target conditions. If there is no ASCII file containing the desired information or if new subscribers have been added to the database and it is desired to replace an existing file, the operator would input the target information into the TRDB (106) using option 1 "Load Survey Data" of the TRDB main menu (FIG. 11A) and then select option 2 "Select Survey Data" which will cause the TRDB to interrogate its database and produce the desired ASCII file (108). The operator would then log into the MMI (110) of the MADS, as described hereinbelow.

Message Assembly and Delivery System

The Message Assembly and Delivery System (MADS) 62 is used by the DBM operator, through the operator's console, to create and test a DBM message, assign a DBM message to a target group or groups and schedule a DBM message for delivery. The MADS delivers DBM messages to screen based devices at scheduled times and collects the responses of the screen based devices to the DBM messages. In the preferred form of the invention, the MADS is a personal computer running on a UNIX operating system. It is this element of the DBM control system that is connected to each SPCS by message delivery circuits and to the response measurement data lines compliant with TR-TSY-000032[3].

Figure 19:
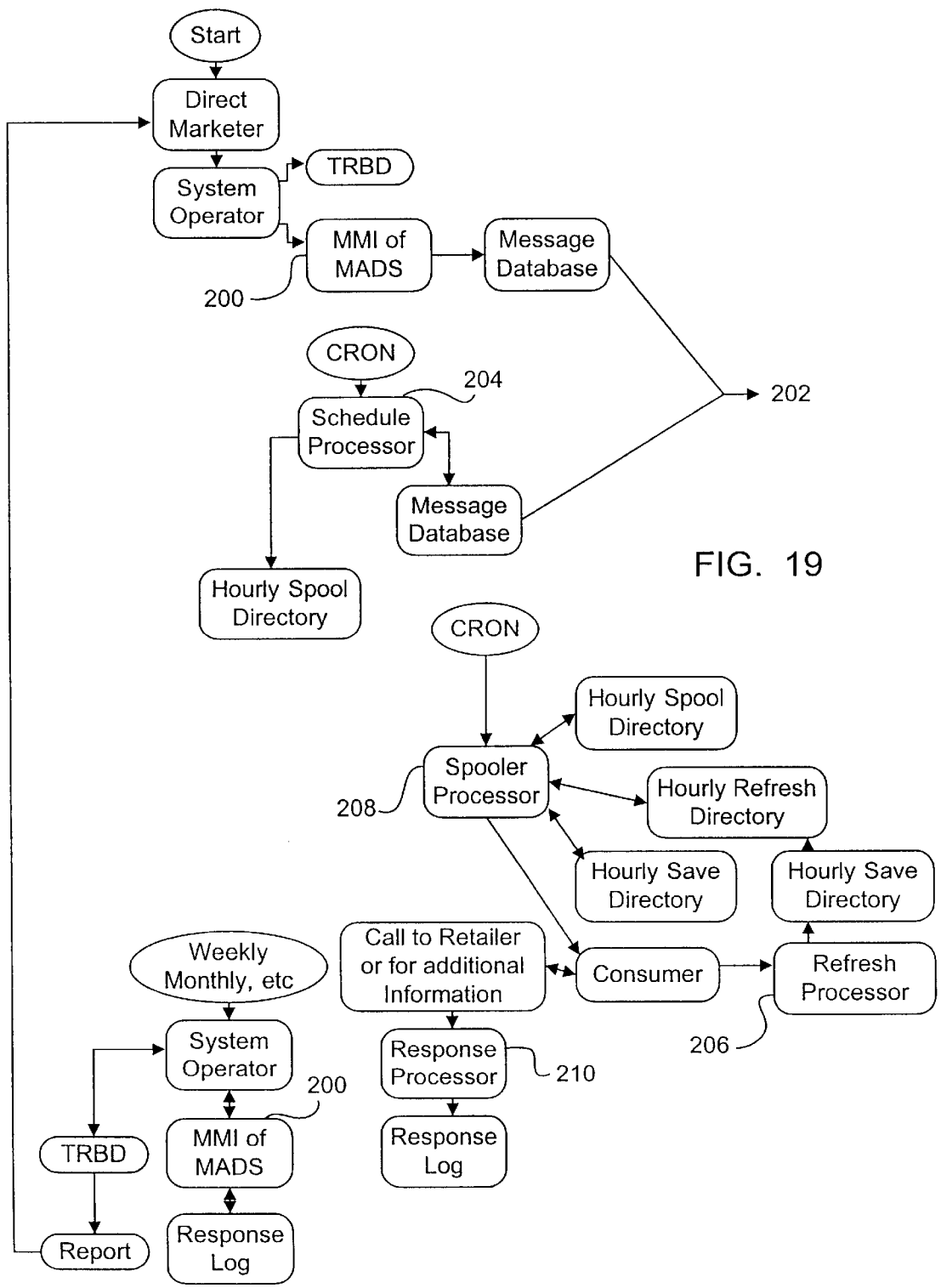
FIG. 19 is a block diagram representation of typical functional components of the overall Message Control System.

The Message Assembly and Delivery System consists of six main software modules created with the SCO UNIX 3.2.2 C Language Development System. With reference to FIG. 19, these modules are the DBM Man Machine Interface (MMI) module 200, the Message Database module 202, the Scheduler Process module 204, the Refresh Mechanism module 206, the Spooler Process module 208, and the Response Mechanism module 210. These modules are described hereinbelow.

DBM Man Machine Interface Module (MMI)

Figure 6A:
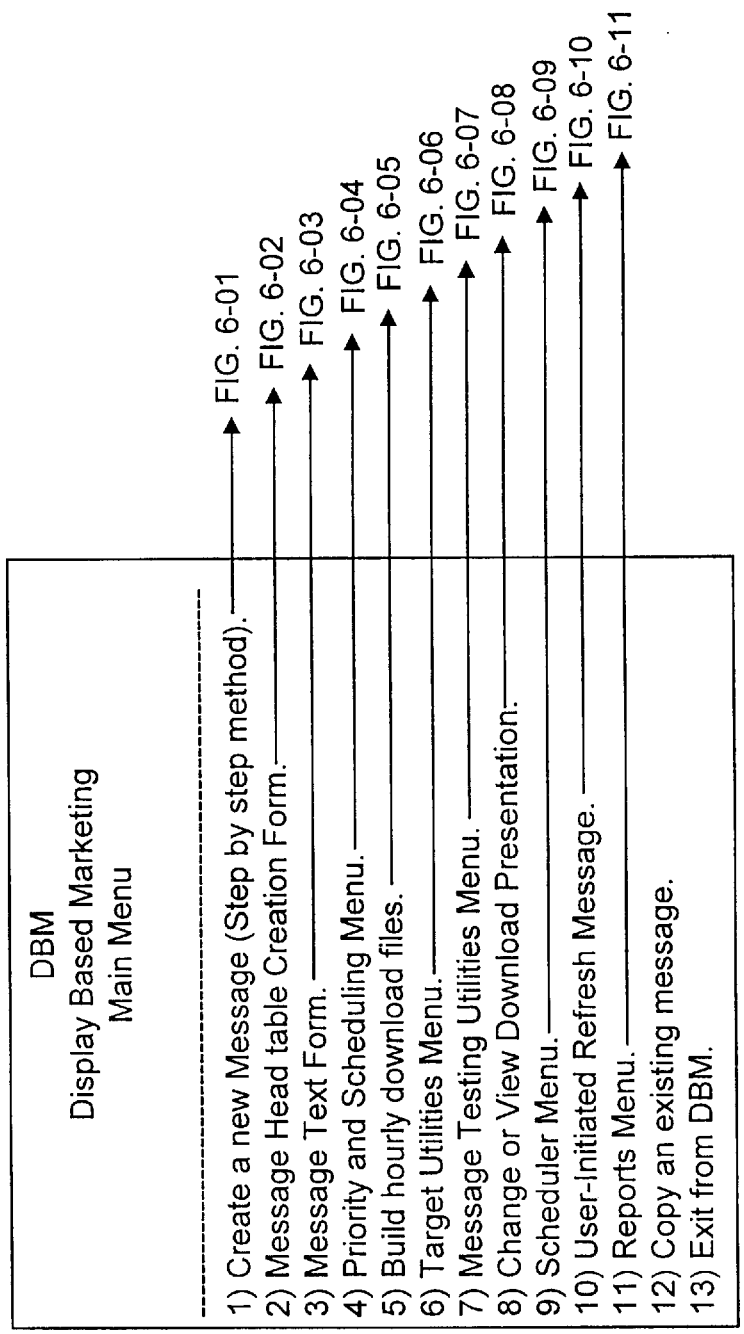
Figure 6E:
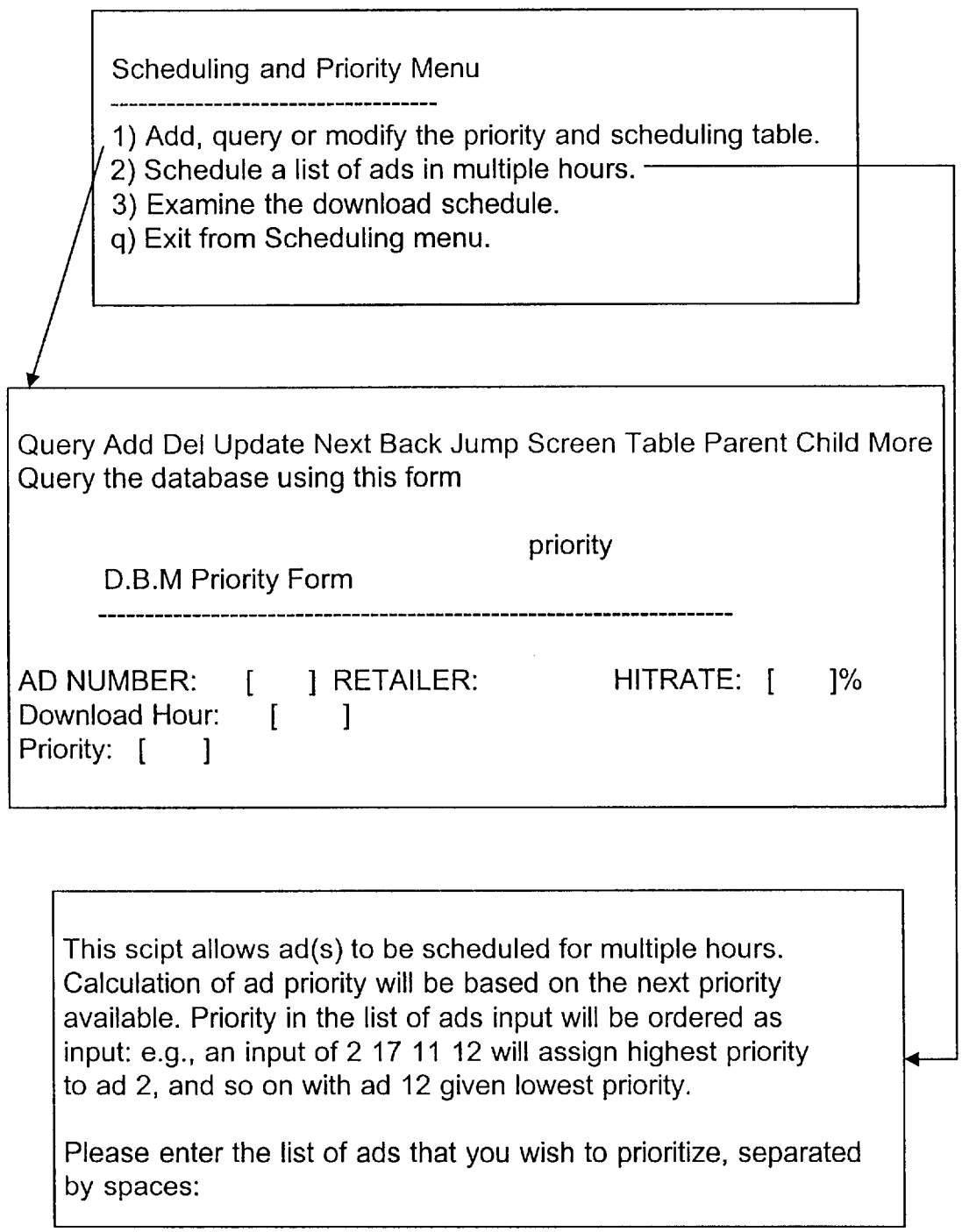
Figure 6G:
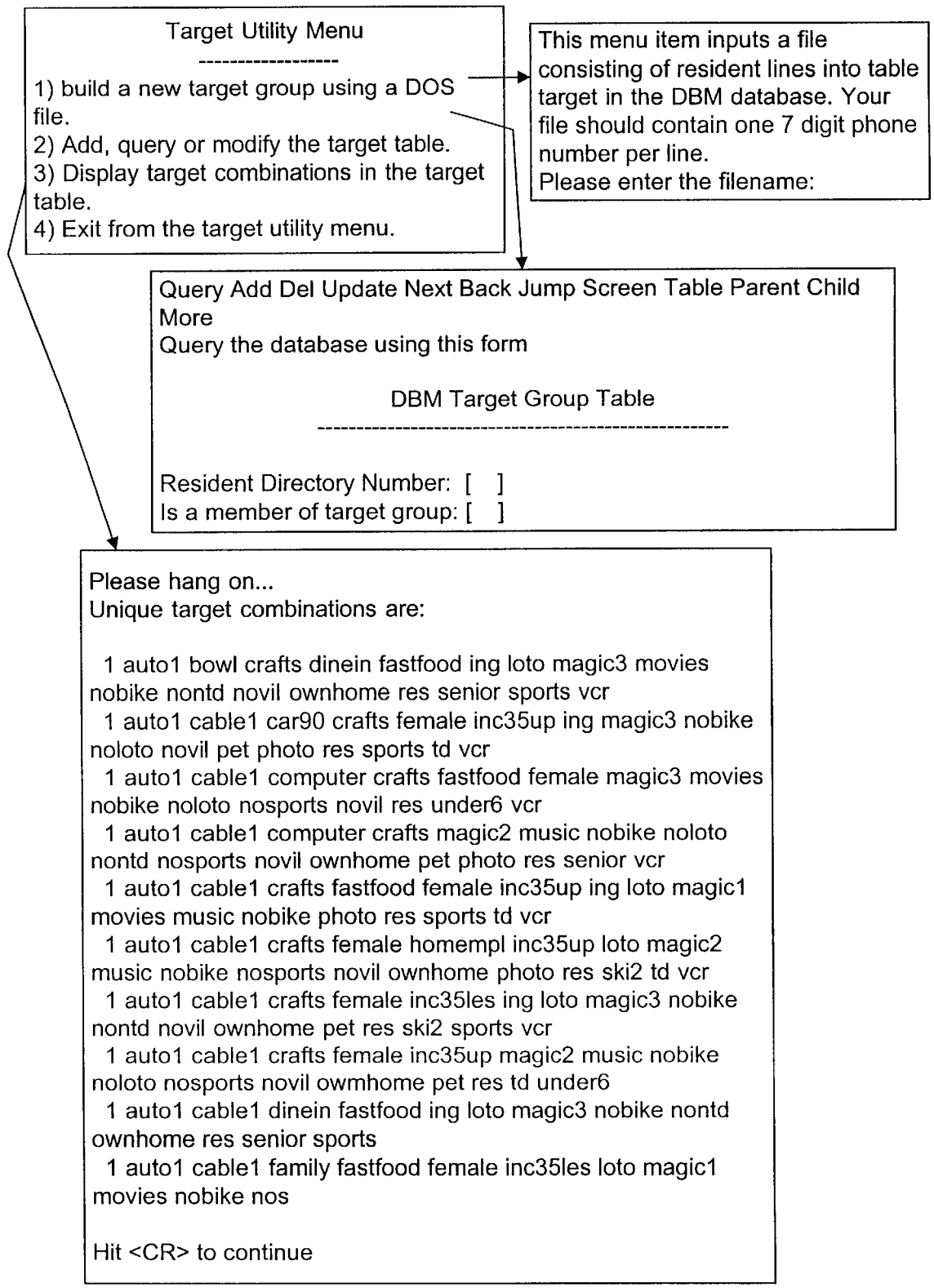
Figure 6H:
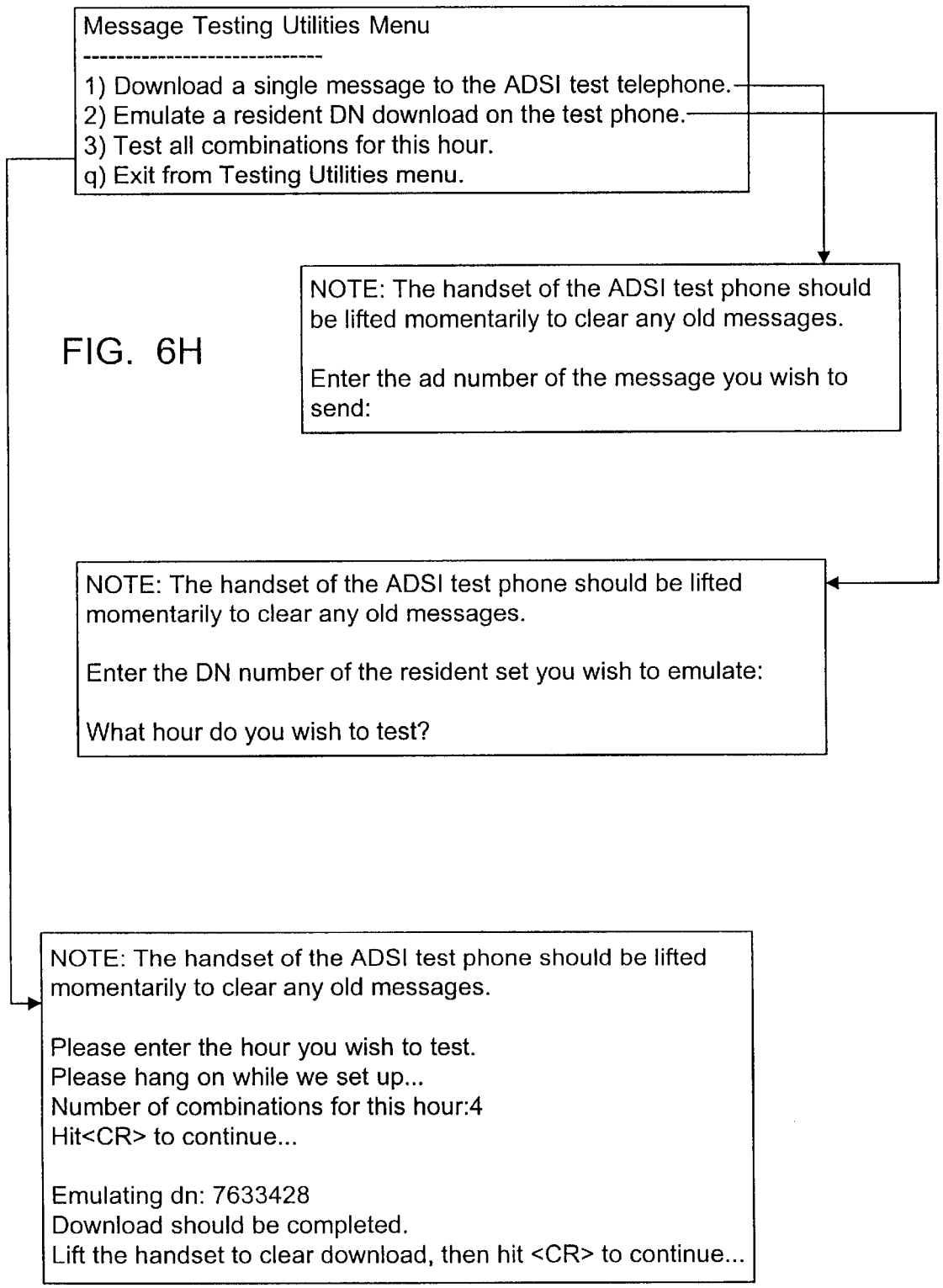
Figure 6J:
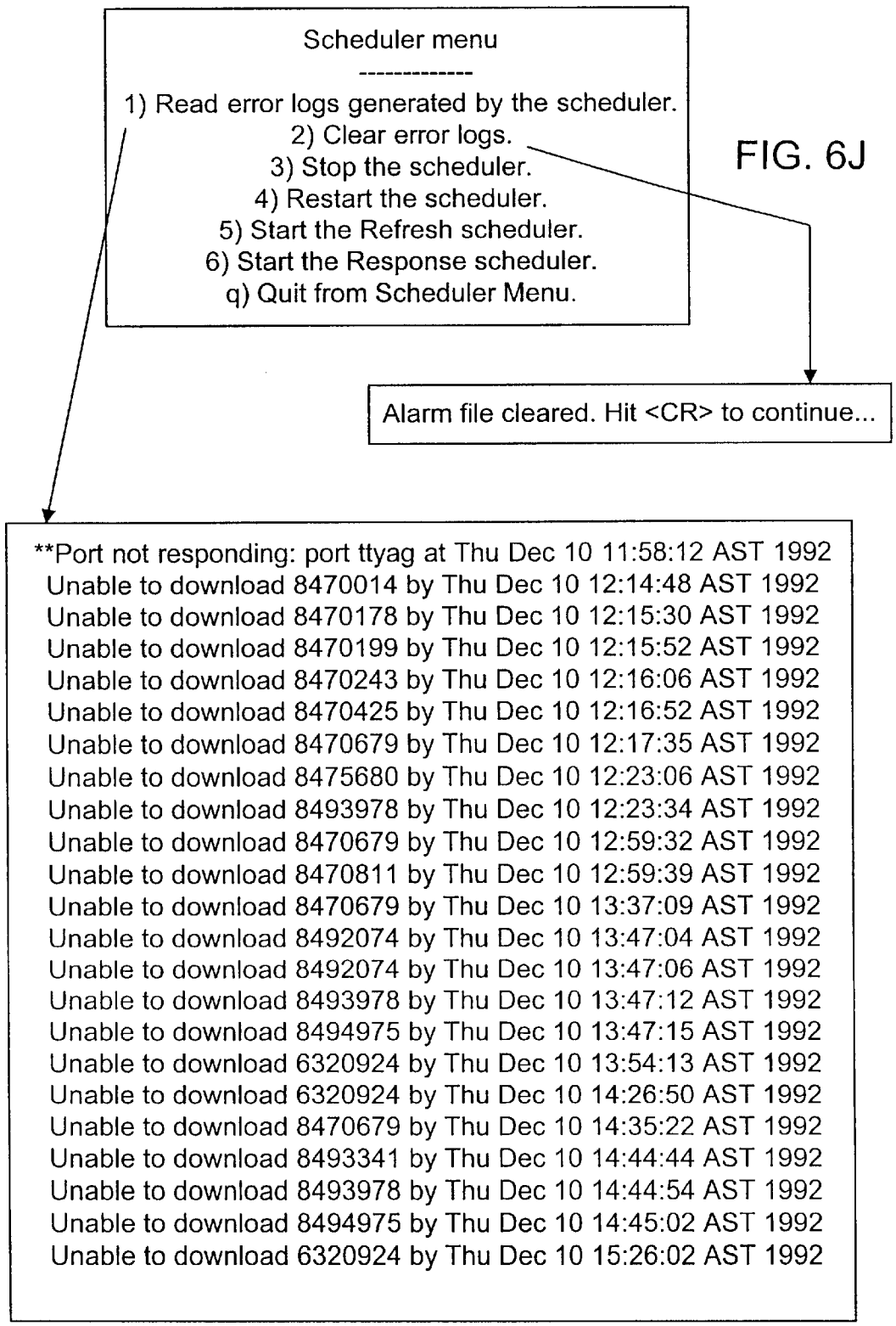

The DBM control system operator interfaces the system through the Man Machine Interface module 200. The MMI executes when the operator logs in and it allows the operator to create, add and delete DBM message text, test DBM messages with an accompanying screen based test device, assign DBM messages to specific target groups, assign telephone numbers to target groups, schedule DBM messages for delivery at specific hours, review or archive to disk response measurement information, stop or restart Spooler Processes, and review alarm information. FIG. 6A illustrates the menu of options provided by the MMI. Target group information, that is an ASCII file of the telephone numbers of the screen based devices to be targeted, is input to the Message Database through the MMI. The source of the ASCII file may be either the TRDB or a database of a retailer/direct marketer. The menu structure of the MMI is illustrated in FIGS. 6B to 6M.

Message Database Module

The Message Database module 202 stores data relating to DBM messages. This includes message text, target groups, the telephone numbers of the display based devices which are receiving DBM messages, the target groups assigned to each number, download priority and scheduling information. The SCO Integra® database product has been employed although other commercially available products may be used without departing from the spirit of the present invention.

Referring once again to FIG. 12, once the operator has created and stored the ASCII of telephone numbers in the TRDB (108) and logged onto the MMI of the MADS, the operator retrieves the ASCII file and defines the telephone numbers as the target group and stores the data in the message database (112). The operator enters and stores the message text into the database using the message entry screens (114) and assigns and stores the target group to the message (116). The operator then schedules the message for delivery and stores the schedule information (118). The operator tests the message on a test facility (120) and, when the test is successful, marks the message as verified and stores the verified message in the message database (122).

Schedule Processor

Schedule Processor 204 retrieves all messages to be delivered to each screen based device for each hour from the Message Database module. The Schedule Processor organizes this data into a plurality of ASCII files, one file per screen based device per hour. That is, each ASCII file contains all messages to be delivered to a screen based device for a given hour. The filename created by the schedule processor identifies the seven digit telephone number of the screen based device to receive the file and an indication of whether the device is compliant with SR-INS-002461 or a sesame telephone. All files to be delivered for a given hour are stored in the same electronic directory. These directories are called "Hourly Spool Directories". These ASCII files are used by the Spooler Processor for delivery. The Schedule Processor can be invoked manually via the MMI for any specific hour (option 5 in FIG. 6A), but normally runs each evening in preparation for the next day.

Figure 13:
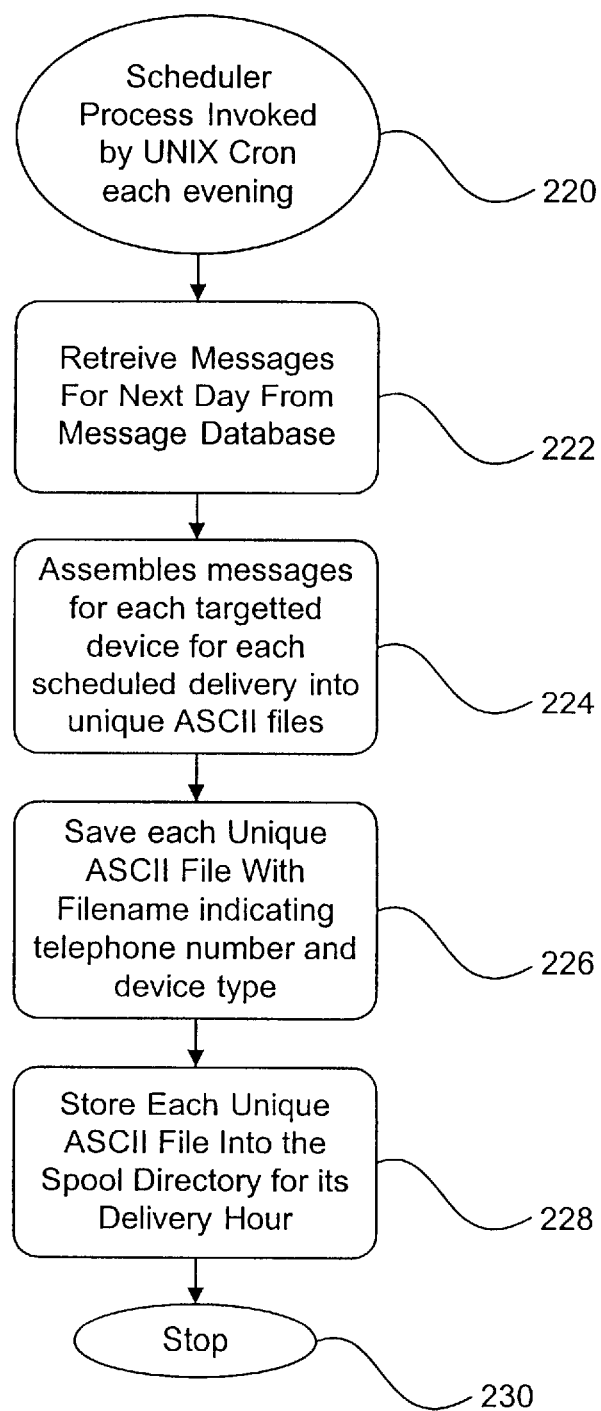
FIG. 13 is a flow chart illustrating the Scheduler process according to a preferred embodiment of the present invention.

Thus, with reference to FIG. 13, at the prescribed time, indicated at 220, the scheduler process is invoked, causing the schedule processor to retrieve all of the messages for the next day from the message database (222), assembles the messages for each of the targeted devices for each scheduled hourly delivery into unique ASCII files (224), save each unique ASCII file with a filename indicating the telephone number and device type (226), and store each unique ASCII file into a spool directory for the prescribed delivery hour (228). The processor then stops (230) until it is invoked again the next evening.

Refresh Processor

Figure 16:
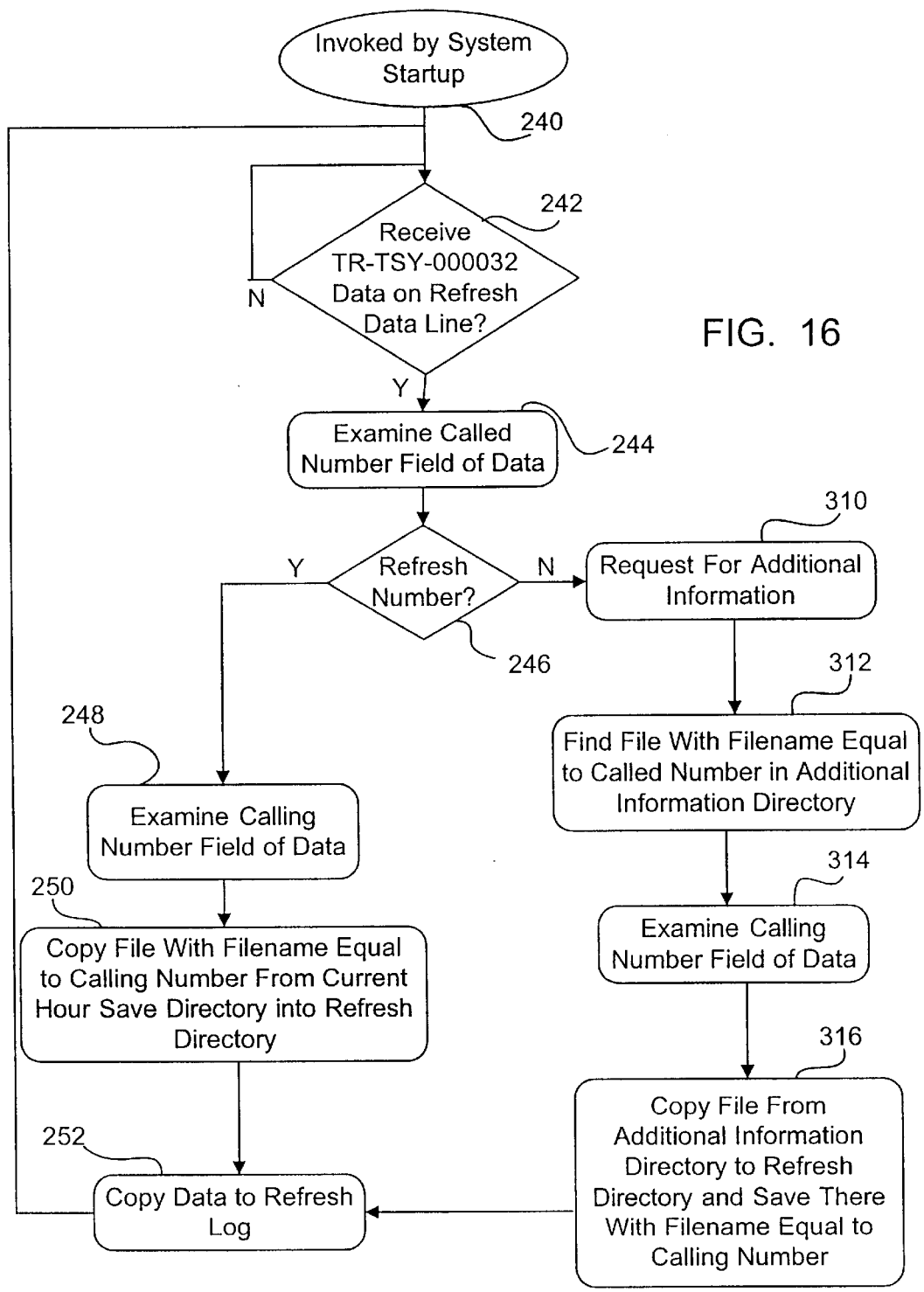
FIG. 16 is a flow chart illustrating the Refresh and the MADS Additional Information processes according to a preferred embodiment of the present invention.

Since DBM messages are lost if a Sesame® telephone is taken off-hook, the DBM control system provides a Refresh Mechanism 206 by which a user can request immediate re-delivery of lost DBM messages. Referring to FIG. 16, the Refresh Mechanism is automatically invoked on system startup (240). To request a re-delivery of lost DBM messages, the Sesame® user calls the refresh facility telephone number then goes on-hook. The call is transmitted over the telephone to the SPCS which then automatically presents the called line and calling line identification information the DBM control system in a manner compliant with TR-TSY-000032[3]. As can be seen at (242), the Refresh Processor continuously monitors the refresh line and when it receives refresh data, examines the called and calling numbers (244) and determines whether it is a refresh number (246). It identifies the call as a refresh request from the called number field. If it determines that it is a refresh request, it identifies the requesting Sesame® from the calling number field (248), and copies the appropriate ASCII file containing all messages to be delivered to the requesting Sesame for the current hour to a Refresh Directory (250) and copies data to a refresh log (252). As explained below, the Spooler Processor will ultimately deliver the DBM messages.

Spooler Processor

Figure 7:
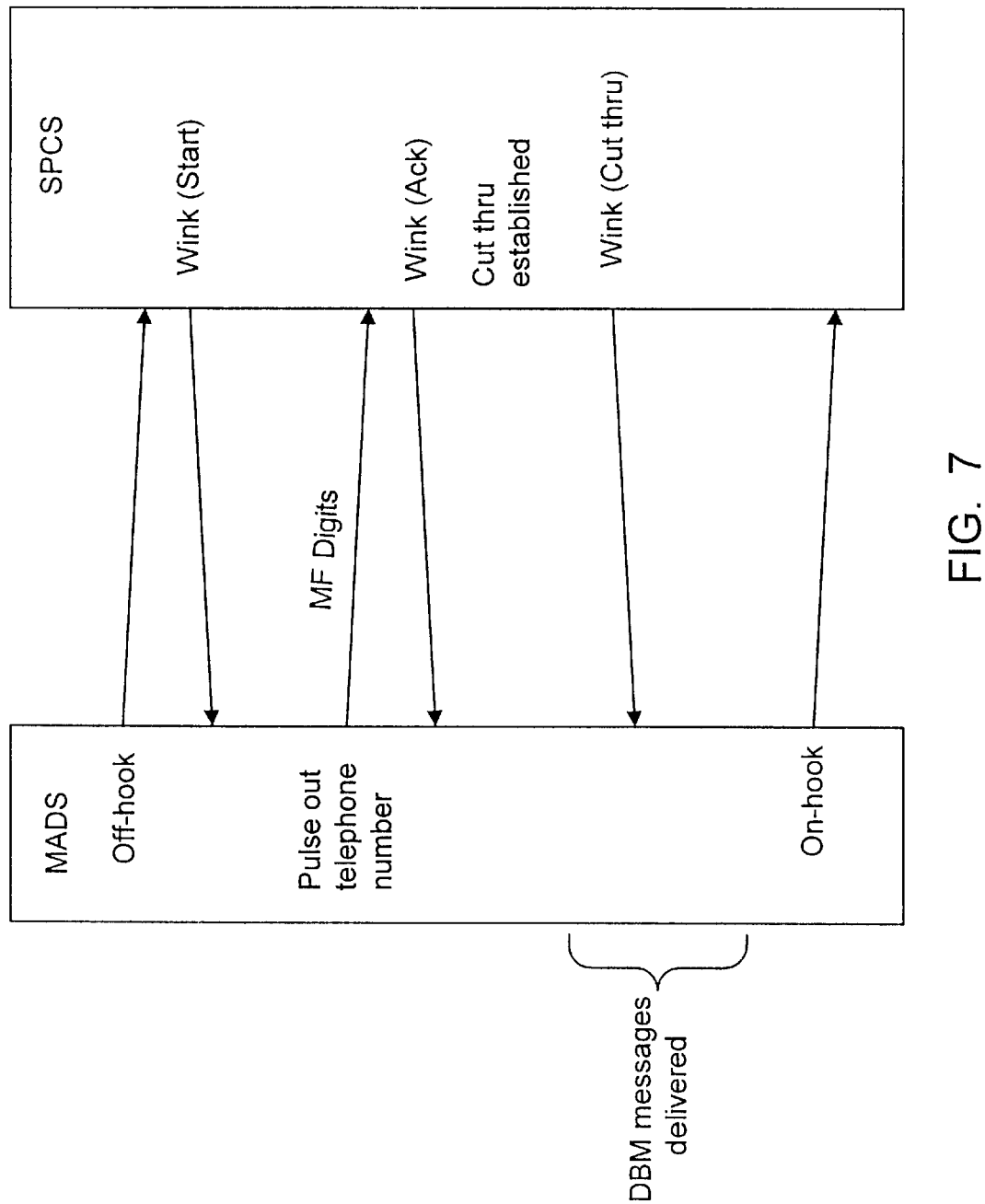
FIG. 7 is a block diagrammatic view of how Message Delivery Circuits are employed for a stored program controlled switch equipped with telemetry trunk type accesses.
Figure 8:
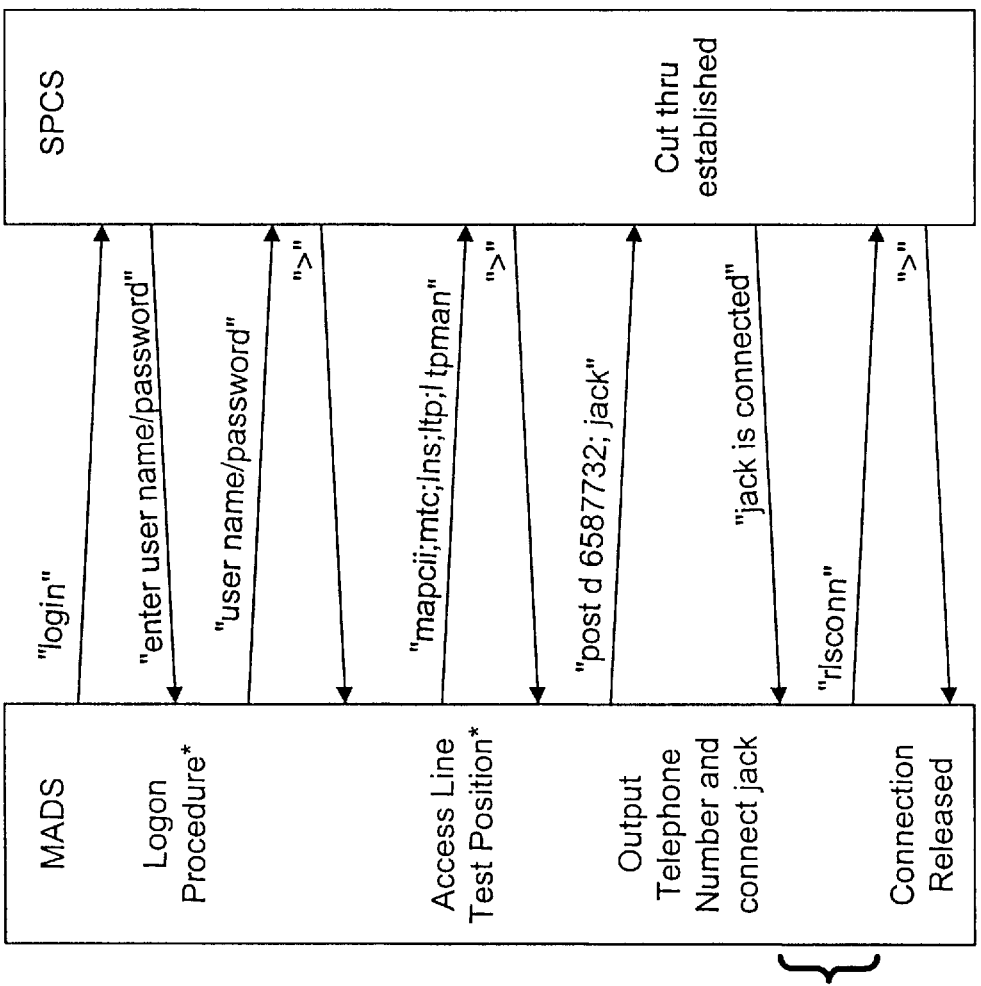
FIG. 8 is a block diagrammatic view of how Message Delivery Circuits are employed for a stored program controlled switch equipped with non-telemetry trunk type accesses.
Figure 14:
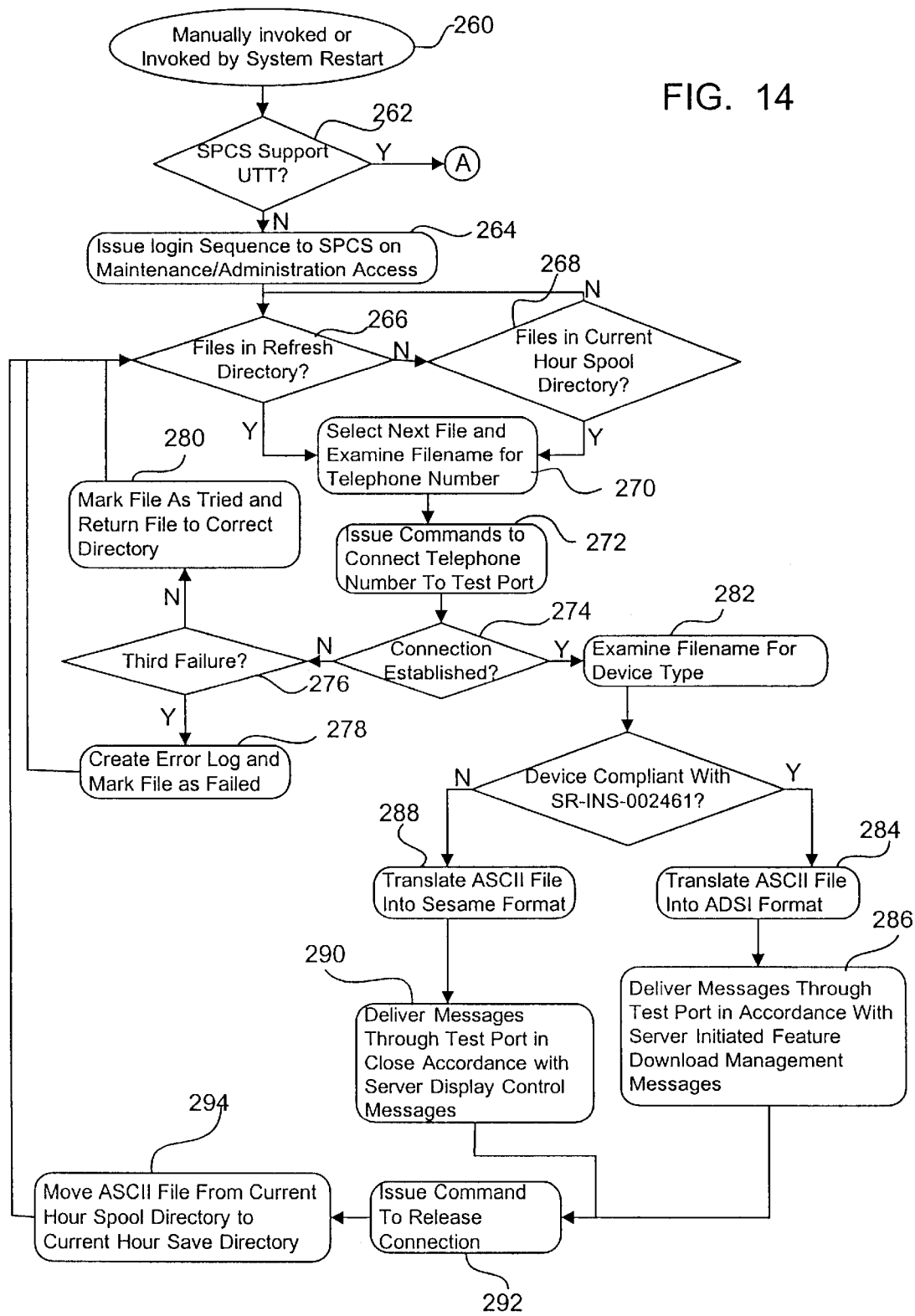
FIGS. 14 and 15 are a flow chart illustrating the Spooler process according to a preferred embodiment of the present invention.
Figure 15:
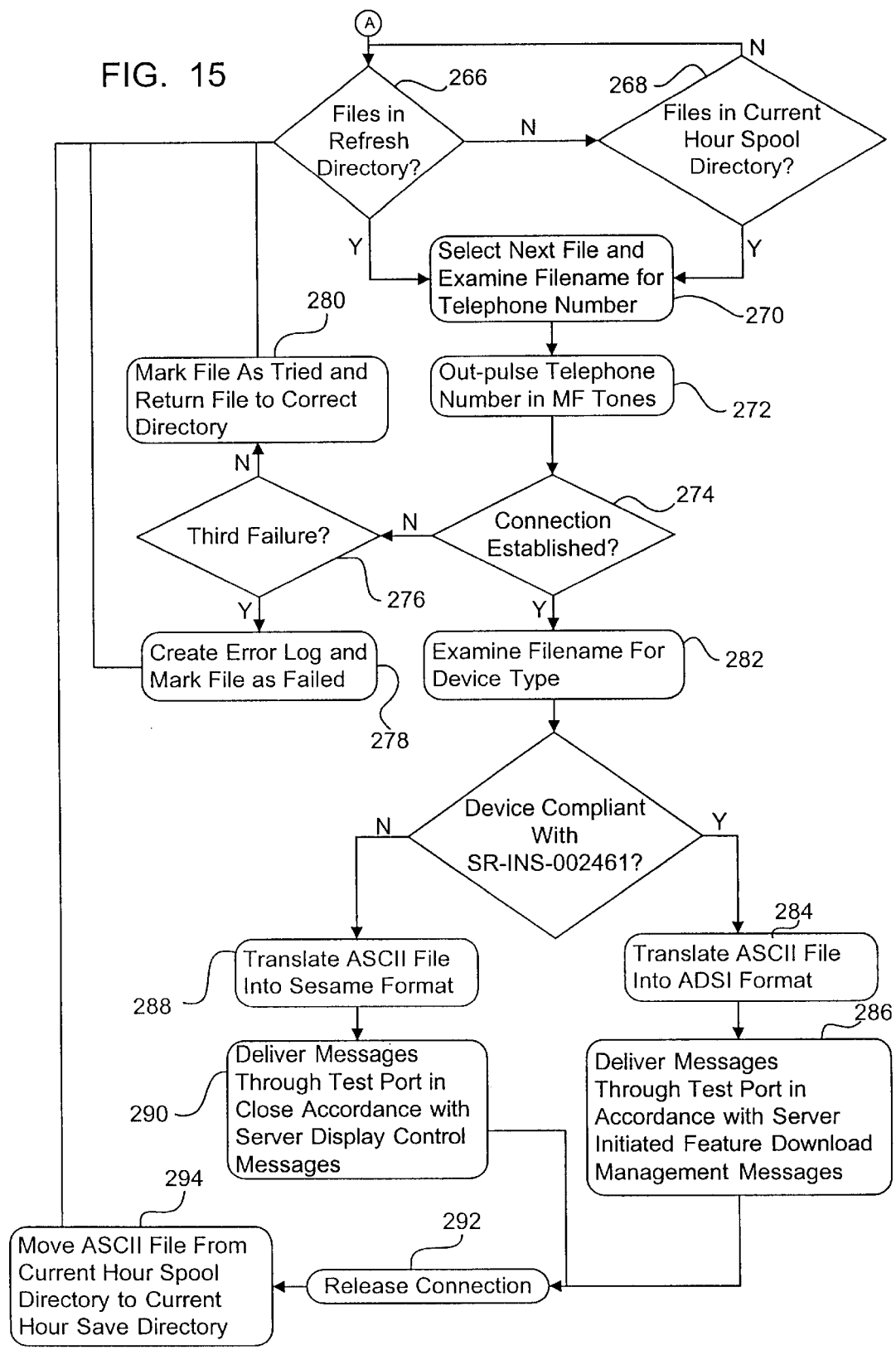

Spooler Processor 208 is illustrated in FIGS. 14 and 15. It may be invoked manually or by system restart. The Spooler Process is implemented using Century Software's TERM® communications package along with C® and UNIX® routines. The Spooler Process can be started via a MMI menu command or on system initialization. It is the Spooler Process that communicates with the SPCS to establish connections through the SPCS to the screen based devices and invokes the message delivery process. It senses busy lines and reschedules when necessary. One Spooler Processor exists for each message delivery circuit to an SPCS. DBM has been designed to be unobtrusive, that is DBM messages are delivered to unattended screen based devices. Therefore, the Message Delivery Circuits provided by the SPCS must establish a connection to the screen based device without ringing the screen based device. The type of Message Delivery Circuits required to each SPCS depend upon the functionality of the SPCS. Two versions of the Spooler Process may exist, one for SPCS equipped with a Telemetry Trunk type accesses and one for SPCS not equipped with Telemetry Trunk type access.

i) If the SPCS provides Telemetry Trunk type access, also referred to as "no-ring access" or "suppressed ring telemetry access", then connections may be made through the SPCS to idle lines without ringing the idle line. The Spooler Processor employs the "Off-Hook" call scenarios as described in Telemetry Trunk specifications as the BellSouth Telecommunications publication TA-73565[6] Generic Switching Requirements for Utility Telemetry Service or the Standards Committee IEEE SCC 31 which is responsible for developing the Industry Standards. On such equipped SPCS, the Spooler Processor is connected to the SPCS via the "no-ring access". The directory number of the targeted screen based device is out-pulsed with MF digits whereby the SPCS cuts through a connection between the DBM System and the screen based device without ringing the screen based device. FIG. 7 illustrates a possible scenario.

ii) If the SPCS is not equipped with Telemetry Trunk type access, then the DBM System connects to the SPCS via a Line Test Position. Typically, a Lines Maintenance Test Position on an SPCS consists of two physical accesses: first, a maintenance and administration access to which an asynchronous terminal is usually connected and through which commands may be issued to the SPCS, and, second, a test port to which analog test equipment for line testing is typically connected. Commands can be issued to the SPCS through the maintenance/administration access to establish a connection between the test port, and, thus, test equipment, and any idle line on the SPCS. The Spooler Processor emulates a maintenance type function on the maintenance/administration access. The Spooler Process issues commands to the SPCS to establish a connection between the test port and the directory number of the targeted screen based device, achieving a connection to the screen based device without alerting the screen based device. The DBM messages are transmitted over, through the test port, to the screen based device. The commands issued to the SPCS to establish the connection between the test port and a directory number vary with different SPCS vendors. The commands in FIG. 8 are specific to a Northern Telecom DMS-100 where the maintenance/administration access is called a MAP and the test port is called a JACK.

As shown at 260 in FIG. 14, the spooler processor may invoked manually or on system restart. The processor then determines (262) whether the SPCS supports UTT. If it does then the process outlined in FIG. 15 is invoked; otherwise the process outlined in FIG. 14 is adopted in which case the processor issues a login sequence to the SPCS on maintenance/administration access (264), as discussed earlier. Thereafter, the Spooler Processor runs continuously and monitors the Refresh Directory (266) and the current hour Spool Directory (268) for files.

When a file is found (270), the filename is checked to determine the telephone number of the targeted screen based device and the type of screen based device targeted. Once the Spooler Processor establishes the "no-ring" connection through the SPCS to an idle screen based device, the Spooler Processor invokes the delivery sequence.

Figure 9:
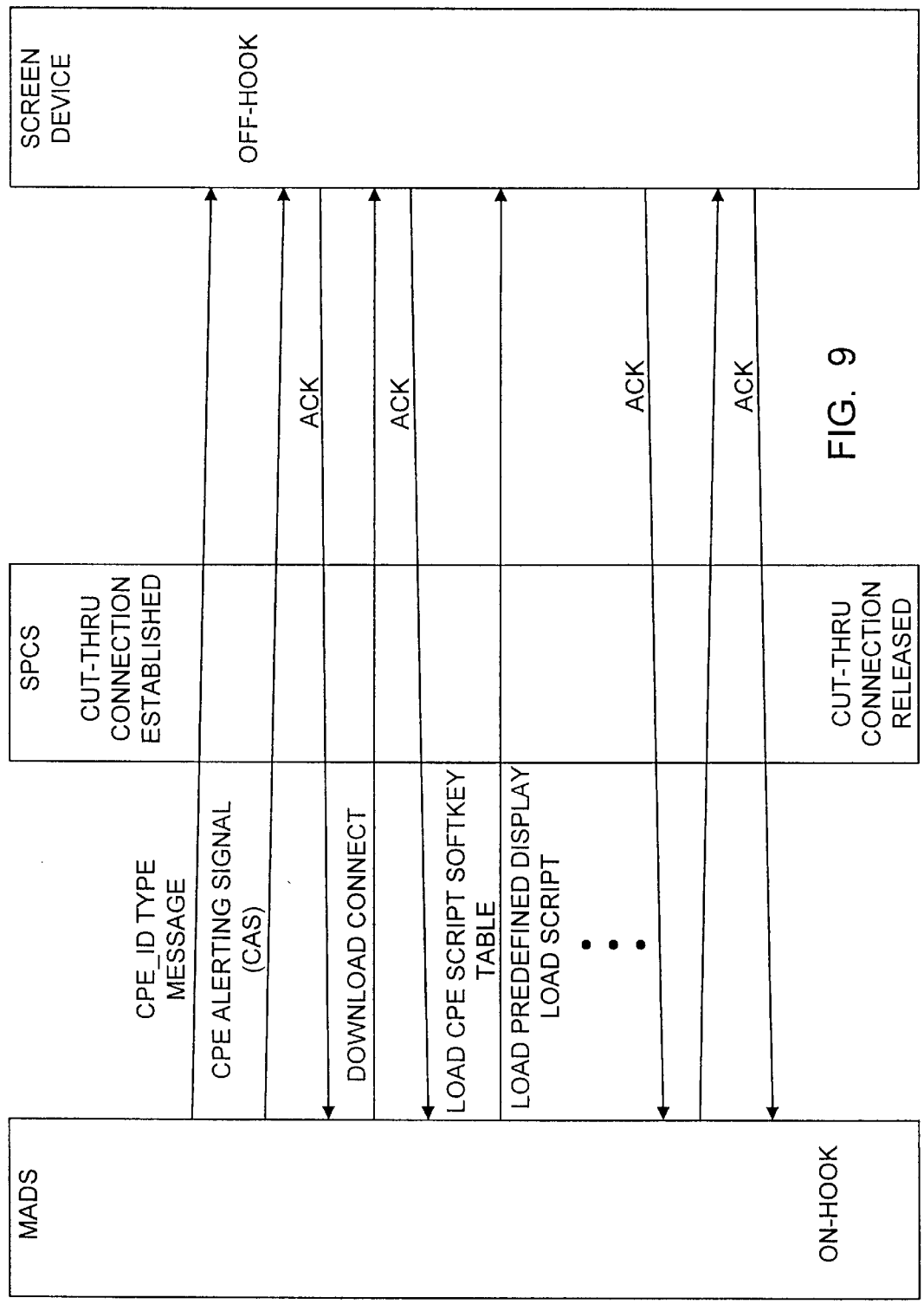
FIG. 9 is a block diagrammatic view illustrating delivery of the messages in accordance with Feature Download Management as specified for Server-initiated service script updates after stored program controlled switch cut through connections have been established.

The delivery sequence employed depends upon the type of screen based device. If the screen based device is compliant with SR-INS-002461[1], then the Spooler Process delivers the DBM messages in accordance with Feature Download Management as specified for server-initiated service script updates (see FIG. 9). If the screen based device is a Sesame® telephone, the Spooler Process delivers the DBM messages in close accordance with the Server Display Control Messages provided in SR-INS-002461[1]. Since these devices do not support the FDM facility, they cannot be forced off-hook as defined in SR-INS-002461[1] section 3.1.3.1.2. Because of this, the DBM messages are delivered to on-hook Sesame® telephones. The Sesame® telephone closely follows the Data Transmission Protocol and Data Link Layer requirements for on-hook data transmission without power ringing as defined in TR-NWT-000030[5]. As such, the Sesame® does not provide Data Link Layer acknowledgments and the Spooler Process does not expect such acknowledgments. The actual commands (Server Display Control Messages) closely follow those defined in TR-NWT-001273[4]. See FIG. 10.

With reference to FIG. 14, the processor issues the commands to connect the telephone number to the test port (272) and determines (274) whether a connection has been established. If it fails to make a connection after three failures, it creates an error log and marks the files as "failed" (276, 278 and 280). If a connection has been established, the processor examines the filename for the device type (282). If the device is compliant with SR-INS-002461, it translates the ASCII files into ADSI format (284) and delivers the messages through the test port in accordance with the Server Initiated Feature Download Management Messages (286). If the device is not compliant with SR-INS-002461, it translates the ASCII files into Sesame format (288) and delivers the messages through the test port in close accordance with the Server Display Control Messages (290). In both cases, the processor than issues the command to release the connection (292), then moves the ASCII file from the Current Hour Spool Directory to the Current Hour Save Directory (294) and repeats the process starting at 266.

The process illustrated in FIG. 15, is very similar to that of FIG. 14 and, accordingly, like reference numerals have been used to designate corresponding steps. The primary difference, as already mentioned, is at 272' where the telephone number is out-pulsed in MF tones.

Response Processor

Figure 17:
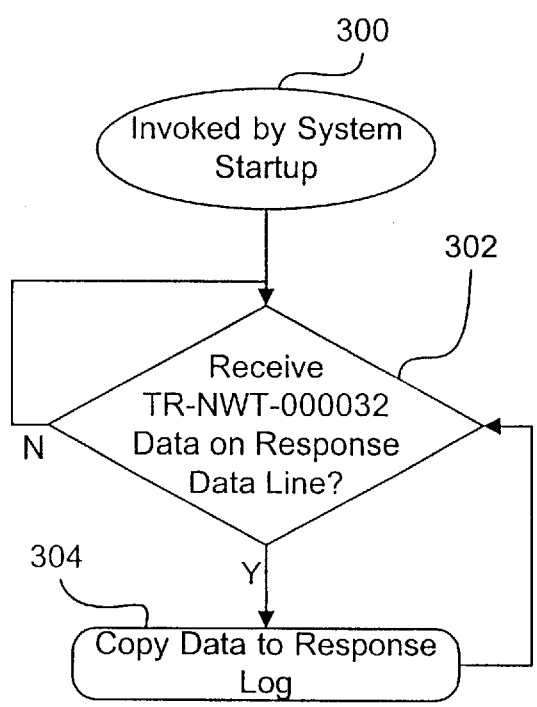
FIG. 17 is a flow chart illustrating the Response process according to a preferred embodiment of the present invention.

With reference to FIG. 17, the Response Mechanism is automatically invoked by system startup (300) and is implemented using in a manner similar to the Refresh Mechanism. Individual DBM messages prompt users to depress a soft key programmed with "Call" or "Listen" to allow the user to obtain additional information about a particular message, a product or a service. The "Call" soft key causes the screen based device to generate a call to a retailer or direct marketer. The "Listen" soft key causes the screen based device to generate a call to information sources such as a voice mail box, an interactive voice response (IVR) system, or an interactive system that follows SR-NWT-002495[2]. When the call is presented to any of these locations or devices by the SPCS, called line and calling line identification information is transmitted from the SPCS to the DBM control system in a manner compliant with TR-TSY-000032[3] (302). The Response Processor stores this information as logs in a Report Directory (304). Through the MMI, the DBM System operator may extract this response data as an ASCII file and send it to the TRDB for report generation or other processing.

Figure 18:
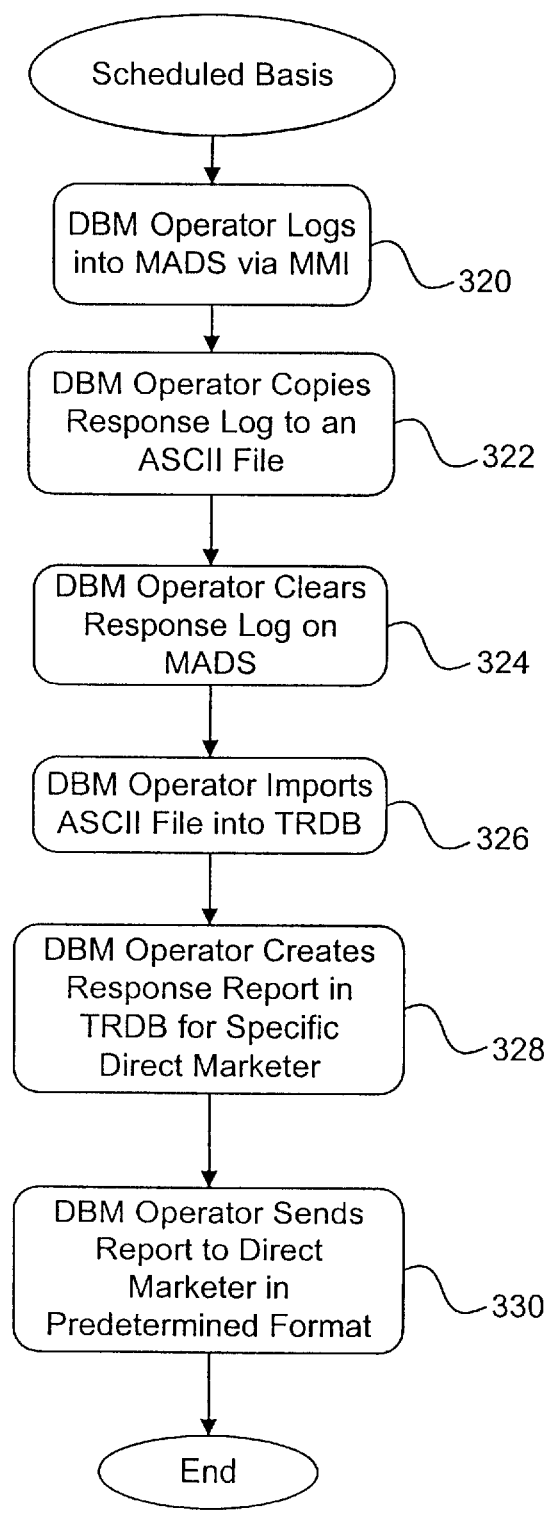
FIG. 18 is a flow chart illustrating the Response Report Generation process according to a preferred embodiment of the present invention.

FIG. 18 illustrates the process for generating a Response Report. The DBM operator logs in to the MADS via the MMI (320), copies the response log to an ASCII file (322) and clears the response log from the MADS (324). The operator then loads the ASCII file into the TRDB (326) and creates a Response Report in the TRDB for the or each specific marketer (328) and sends the report to the marketer in a predetermined format (330).

Interactive Information Platforms

The Interactive Information Platforms (IIP) allow the DBM System to provide additional information on DBM messages. The "Listen" soft key in a DBM message causes the screen based device to generate a call to an IIP. This has two benefits: first, the number of individual DBM messages sent at a scheduled delivery can be maximized by minimizing the size of each individual message; second, calls to these platforms generated through users pressing the "Listen" soft key are the principal means of providing a measurement of response to DBM messages. IIPs take the form of: voice mail systems and IVR systems providing voice only additional information; and interactive systems that follow SR-NWT-002495[2] providing interactive voice and display based additional information. The MADS functions as an additional information source through the Refresh Mechanism. To provide additional information from the MADS, calls made by users of screen based devices by pressing a soft key for additional information terminate on a voice mail system. The voice mail system simply thanks the user for calling and instructs the user to go on-hook. As illustrated in FIG. 16, when the call is presented to the voice mail system by the SPCS, called line and calling line identification information is transmitted from the SPCS to the DBM System in a manner compliant with TR-TSY-000032[3]. The MADS Refresh Processor examines the called and calling numbers (246), identifies the call as a request for additional information on a specific DBM message from the called number field (310), locates the file with the filename equal to the Called Number in an additional information directory (312), identifies the requesting screen based device from the calling number field (314), and copies the file as ASCII file containing additional information into the current hour to a Refresh Directory (316). The Spooler Processor then delivers the DBM additional information message.

An IIP, with a data connection into the Targeting and Response Database, may provide the facility to allow the screen based device users to change their targeting profile. This affords the user control over the message types and message contents to be delivered.

1. SR-INS-002461[1], Customer Premises Equipment Compatibility Consideration for the Analog Display Service Interface, Issue 1, Bellcore, December 1992.
2. SR-NWT-002495[2] Guidelines for Writing Applications Which Use the Analog Display Services Interface (ADSI) for Data Communications, Issue 1, Bellcore.
3. TR-TSY-000032[3] CLASS Bulk Calling Line Identification, Issue 1, Bellcore, November 1988.
4. TR-NWT-001273[4], Generic Requirements for an SPCS to Customer Premises Equipment Data Interface for Analog Display Services, Issue 1, Bellcore, December 1992.
5. TR-NWT-000030[5], Voiceband Data Transmission Interface Generic Requirements, Issue 2, Bellcore, October 1992.
6. TA-73565[6], Generic Switching Requirements for Utility Telemetry Service, BellSouth Telecommunications, April 1992.

The embodiments of the invention in which an exclusive property of privilege is claimed are defined as follows:

1. A marketing system for use in a public switched telephone system having stored program controlled switches connected to customer premise equipment having an Analog Display Service Interface, said system comprising:

means for storing predetermined information respecting each said customer premise equipment;

means for assembling and managing messages including:
means for creating and storing a message to be delivered;
means for selecting one or more of such customer premise equipment to which said message is to be delivered;
means for linking each said message with said one or more of said customer premise equipment;
means for scheduling the delivery of said messages at a predetermined time;
means for detecting called line and calling line identification to identify any telephone call sent from each customer premise equipment in response to each message delivered thereto;
means for storing the called line and calling line identification thereby storing the response of each customer premise equipment to each message delivered thereto; and
means for generating response measurement statistics for each message based upon the one or more customer premise equipment to which said message is delivered and the customer premise equipment from which a response to said message is made.

2. A marketing system as defined in claim 1 further comprising means responsive to the called and calling line identification to deliver to the identified customer premise equipment further information regarding a particular message.

3. A system for use in a public switched telephone system having stored program controlled switches connected to screen based devices having an Analog Display Service Interface, said system comprising:

means for storing predetermined attributes of the user or users of each said screen based devices and being responsive to a predetermined input to output screen based devices identification data of all screen based devices which meet specified attributes;

means for assembling and delivering messages including:
means for creating, editing and storing messages;
means for scheduling said messages for delivery at a predetermined time;
means responsive to a predetermined input from a user of said screen based device to cause messages previously delivered to said customer premise equipment to be redelivered;
means associated with each message delivery circuit of stored program controlled switches for continuously monitoring messages to be delivered, translating messages to be delivered into a predetermined format required by the screen based device, communicating with the stored program controlled switches to establish connections through the stored program controlled switches to said screen based devices, sensing busy lines and rescheduling when said message communication lines are busy;
means responsive to predetermined inputs by a user of said screen based devices providing additional information about a particular message or cause said screen based device to generate a call to the source of a particular message or to an information source such as a voice mail box, an interactive voice response (IVR) system, or an interactive system that follows SR-NWT-002495[2];
means responsive to one of said calls for transmitting called line and calling line identification information from the stored program controlled switch associated with said screen based devices to the System in a manner compliant with TR-TSY-000032[3]; and means for receiving and storing said called line and calling line identification information; and means for selectively accessing and actuating said receiving and storing means to retrieve said called line and calling line identification information.

4. A process for non-intrusively delivering informational, promotional and advertisement messages over a public telephone network to unattended screen based devices, comprising the steps of:

creating a message to be delivered;

storing said message;

selecting one or more of said screen based devices to which said message is to be delivered;

scheduling said message for delivery at a predetermined time;

delivering said message at said predetermined time;

detecting called line and calling line identification to identify any telephone call sent from each screen based device in response to said message delivered thereto;

storing the called line and calling line identification thereby storing the response of each screen based device to said message delivered thereto; and generating response measurement statistics for said message based upon each screen based device to which said message is delivered and the screen based device from which a response to said message is made.

5. A process as defined in claim 4, said step of creating a message including the step of incorporating into said message scripts operable to program programmable keys on said devices.

6. A process as defined in claim 5, said scripts including auto dialling scripts which cause a screen based device to call through the public telephone network to the message sponsor for additional verbal information.

7. A process as defined in claim 5, said scripts including auto dialling scripts which cause a screen based device to call through the public telephone network to an interactive voice system and/or an interactive screen based text system and/or interactive video system for additional information.

* * * * *